(12) United States Patent
Ko et al.

(10) Patent No.: US 11,943,790 B2
(45) Date of Patent: *Mar. 26, 2024

(54) METHOD OF TRANSMITTING AND RECEIVING BROADCASTING CHANNEL AND DEVICE THEREFOR

(71) Applicant: LG Electronics Inc., Seoul (KR)

(72) Inventors: Hyunsoo Ko, Seoul (KR); Kijun Kim, Seoul (KR); Sukhyon Yoon, Seoul (KR); Eunsun Kim, Seoul (KR); Youngsub Kim, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,439

(22) Filed: Apr. 26, 2023

(65) Prior Publication Data

US 2023/0262736 A1 Aug. 17, 2023

Related U.S. Application Data

(63) Continuation of application No. 17/232,829, filed on Apr. 16, 2021, now Pat. No. 11,665,712, which is a
(Continued)

(51) Int. Cl.
*H04W 72/30* (2023.01)
*H04J 11/00* (2006.01)
*H04L 5/00* (2006.01)
*H04L 5/10* (2006.01)
*H04W 56/00* (2009.01)
*H04W 72/044* (2023.01)
*H04W 72/0446* (2023.01)
*H04W 76/11* (2018.01)

(52) U.S. Cl.
CPC ........ *H04W 72/30* (2023.01); *H04J 11/0079* (2013.01); *H04L 5/0051* (2013.01); *H04L 5/10* (2013.01); *H04W 56/001* (2013.01); *H04W 72/0446* (2013.01); *H04W 72/0466* (2013.01); *H04W 76/11* (2018.02)

(58) Field of Classification Search
None
See application file for complete search history.

(56) References Cited

U.S. PATENT DOCUMENTS

2013/0107704 A1*  5/2013  Dinan .............. H04W 72/0446
                                                                370/230
2016/0315739 A1* 10/2016  Han ....................... H04W 4/14
2018/0160378 A1*  6/2018  Bergquist .......... H04W 74/0833

OTHER PUBLICATIONS

ETSI TS 136 211 v14.2.0, Apr. 2017, pp. 1-196 (Year: 2017).*
Campos, Understanding the 5G NR Physical Layer, Keysight Technologies, Nov. 2017, pp. 1-111. (Year: 2017).*

* cited by examiner

*Primary Examiner* — Nicholas Sloms
(74) *Attorney, Agent, or Firm* — Fish & Richardson P.C.

(57) ABSTRACT

The present disclosure provides a method of transmitting a Physical Broadcasting Channel (PBCH) by a base station in a wireless communication system. Particularly, the method may include generating a PBCH payload including bits indicating a frame in which the PBCH is transmitted; scrambling at least some of the bits included in the PBCH payload using second and third least significant bits among the bits; and transmitting the bits of the PBCH payload including the at least some scrambled bits to a user equipment.

20 Claims, 16 Drawing Sheets

Related U.S. Application Data continuation of application No. 16/318,130, filed as application No. PCT/KR2018/008577 on Jul. 27, 2018, now Pat. No. 11,006,387.

(60) Provisional application No. 62/566,519, filed on Oct. 1, 2017, provisional application No. 62/538,065, filed on Jul. 28, 2017.

(A) CONTROL-PLANE PROTOCOL STACK (B) USER-PLANE PROTOCOL STACK

_US 11,943,790 B2_

METHOD OF TRANSMITTING AND RECEIVING BROADCASTING CHANNEL AND DEVICE THEREFOR

CROSS-REFERENCE TO RELATED APPLICATIONS

This application is a continuation of U.S. application Ser. No. 17/232,829, filed on Apr. 16, 2021, which is a continuation of U.S. application Ser. No. 16/318,130, filed on Jan. 15, 2019, now U.S. Pat. No. 11,006,387, which is a National Stage application under 35 U.S.C. § 371 of International Application No. PCT/KR2018/008577, filed on Jul. 27, 2018, which claims the benefit of U.S. Provisional Application No. 62/566,519, filed on Oct. 1, 2017 and U.S. Provisional Application No. 62/538,065, filed on Jul. 28, 2017. The disclosures of the prior applications are incorporated by reference in their entirety.

TECHNICAL FIELD

The present disclosure relates to a method of transmitting and receiving a broadcasting channel and device therefor, and more particularly, to a method of performing transmission by scrambling bits included in a payload of a broadcasting channel and device therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

The object of the present disclosure is to provide a method of transmitting and receiving a broadcasting channel and device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In an embodiment of the present disclosure, provided is a method of transmitting a Physical Broadcasting Channel (PBCH) by a base station in a wireless communication system. The method may include: generating a PBCH payload including bits indicating a frame in which the PBCH is transmitted; scrambling at least some of the bits included in the PBCH payload using second and third least significant bits among the bits; and transmitting the bits of the PBCH payload including the at least some scrambled bits to a user equipment.

In this case, the at least some of the bits included in the PBCH payload may be scrambled using a first scrambling sequence based on the second and third least significant bits.

In addition, the bits of the PBCH payload including the at least some scrambled bits may be scrambled using a second scrambling sequence based on an index of a Synchronization Signal Block (SSB) including the PBCH.

Moreover, a Demodulation Reference Signal (DMRS) may be mapped to a symbol in which the PBCH is transmitted, and the second scrambling sequence may be generated based on bits for the index of the SSB, which is used to generate a sequence of the DMRS.

Further, the first and second scrambling sequences may be generated further using an identifier of a cell corresponding to the base station.

Additionally, the second and third least significant bits may not be scrambled.

Additionally, an identical scrambling sequence may be used during a time period corresponding to two frames.

In another embodiment of the present disclosure, provided is a base station for transmitting a Physical Broadcasting Channel (PBCH) in a wireless communication system. The base station may include: a transceiver configured to transmit and receive radio signals to and from a user equipment; and a processor configured to control the transceiver. In this case, the processor may be configured to: generate a PBCH payload including bits indicating a frame in which the PBCH is transmitted; scramble at least some of the bits included in the PBCH payload using second and third least significant bits among the bits; and control the transceiver to transmit the bits of the PBCH payload including the at least some scrambled bits to the user equipment.

In still another embodiment of the present disclosure, provided is a method of receiving a Physical Broadcasting Channel (PBCH) by a user equipment in a wireless communication system. The method may include: receiving the PBCH included in a Synchronization Signal Block (SSB) in a specific frame; obtaining second scrambled bits and second and third least significant bits among bits indicating the specific frame by descrambling first scrambled bits received on the PBCH; and identifying the specific frame by descrambling the second scrambled bits based on the second and third least significant bits.

In this case, the first scrambled bits may be descrambled based on bits for an index of the SSB, which is obtained from a Demodulation Reference Signal (DMRS) received in a symbol to which the PBCH is mapped.

In addition, the first and second scrambled bits may be descrambled further using an identifier of a cell corresponding to a base station.

Moreover, a scrambling sequence used for scrambling the second scrambled bits may be equally used during a time period corresponding to two frames.

In a further embodiment of the present disclosure, provided is a user equipment for receiving a Physical Broadcasting Channel (PBCH) in a wireless communication system. The user equipment may include: a transceiver configured to transmit and receive radio signals to and from a base station; and a processor configured to control the transceiver. In this case, the processor may be configured to: control the transceiver to receive the PBCH included in a Synchronization Signal Block (SSB) in a specific frame; obtain second scrambled bits and second and third least significant bits among bits indicating the specific frame by descrambling first scrambled bits received on the PBCH; and identify the specific frame by descrambling the second scrambled bits based on the second and third least significant bits.

According to the present disclosure, two scrambling sequences can be applied to bits included in a payload of a broadcasting channel, thereby transmitting and receiving the broadcasting channel more stably.

It will be appreciated by persons skilled in the art that the effects that can be achieved with the present disclosure are not limited to what has been particularly described hereinabove and other effects of the present disclosure will be more clearly understood from the following detailed description taken in conjunction with the accompanying drawings.

DETAILED DESCRIPTION

Figure 1:
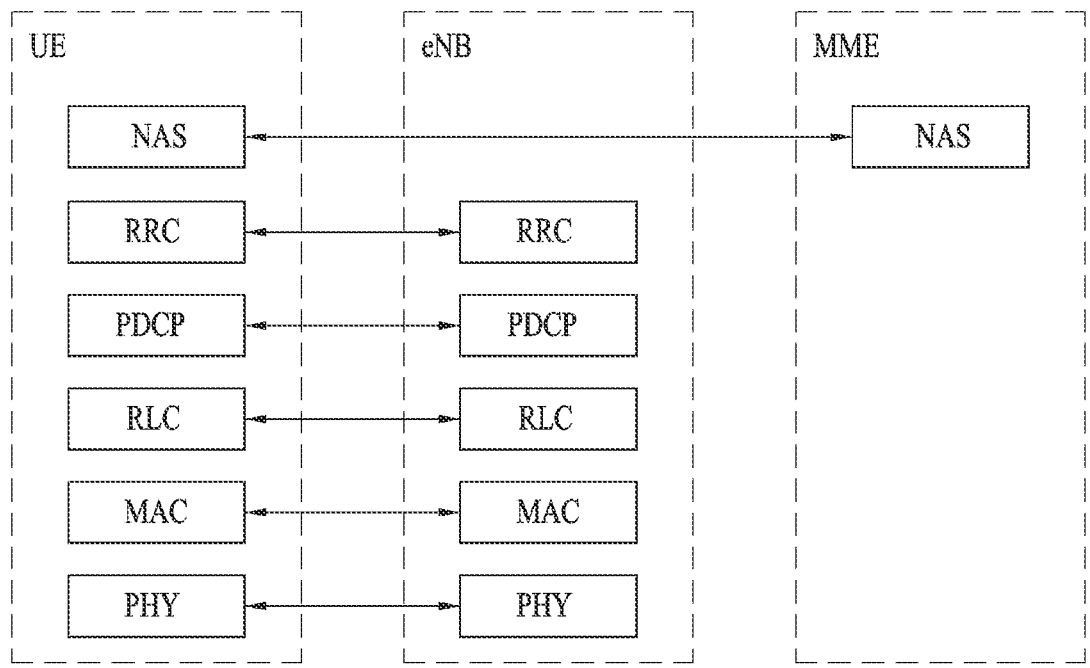
FIG. 1 is a view illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 1:
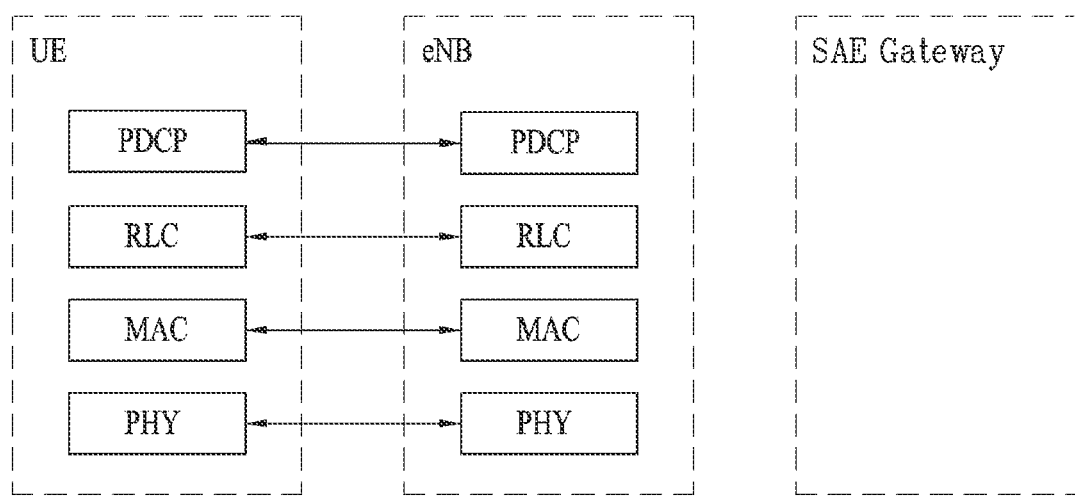

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
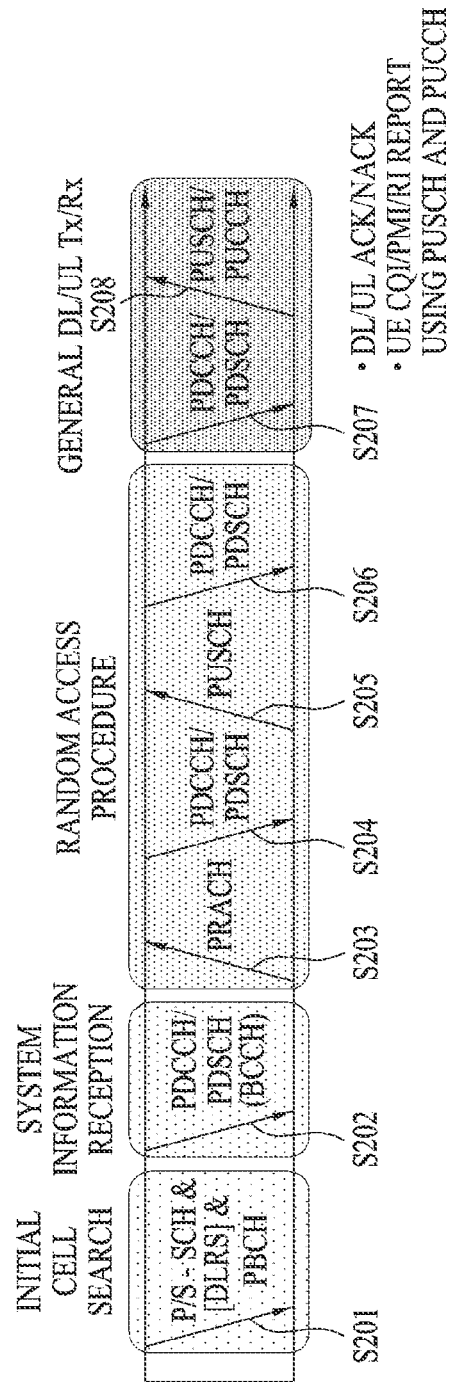
FIG. 2 is a view illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/

NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
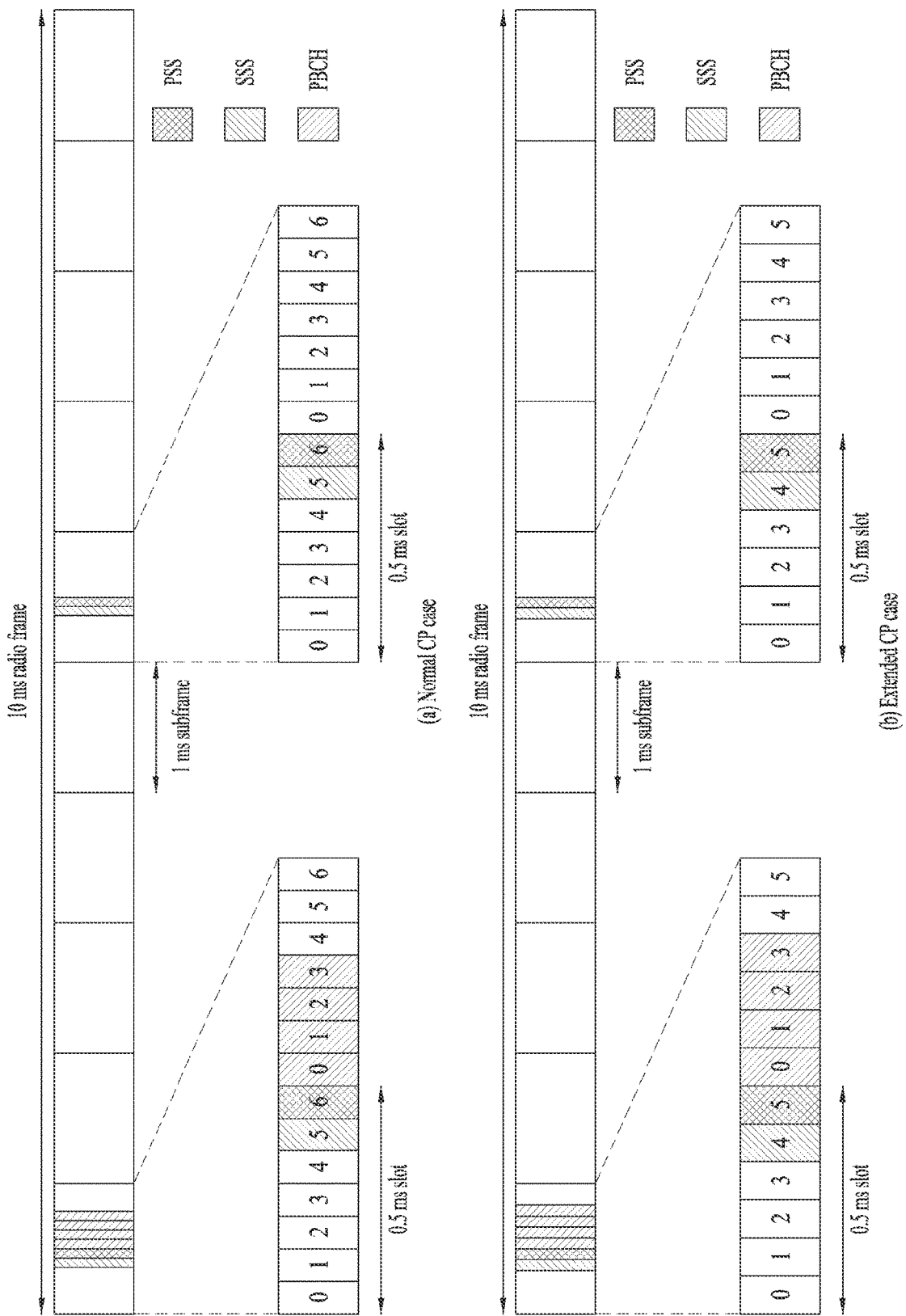
FIG. 3 is a view illustrating a radio frame structure for transmitting a synchronization signal (SS) in a long term evolution (LTE) system.

FIG. 3 is a diagram illustrating a radio frame structure for transmitting a synchronization signal (SS) in LTE system. In particular, FIG. 3 illustrates a radio frame structure for transmitting a synchronization signal and PBCH in frequency division duplex (FDD). FIG. 3(a) shows positions at which the SS and the PBCH are transmitted in a radio frame configured by a normal cyclic prefix (CP) and FIG. 3(b) shows positions at which the SS and the PBCH are transmitted in a radio frame configured by an extended CP.

Figure 4:
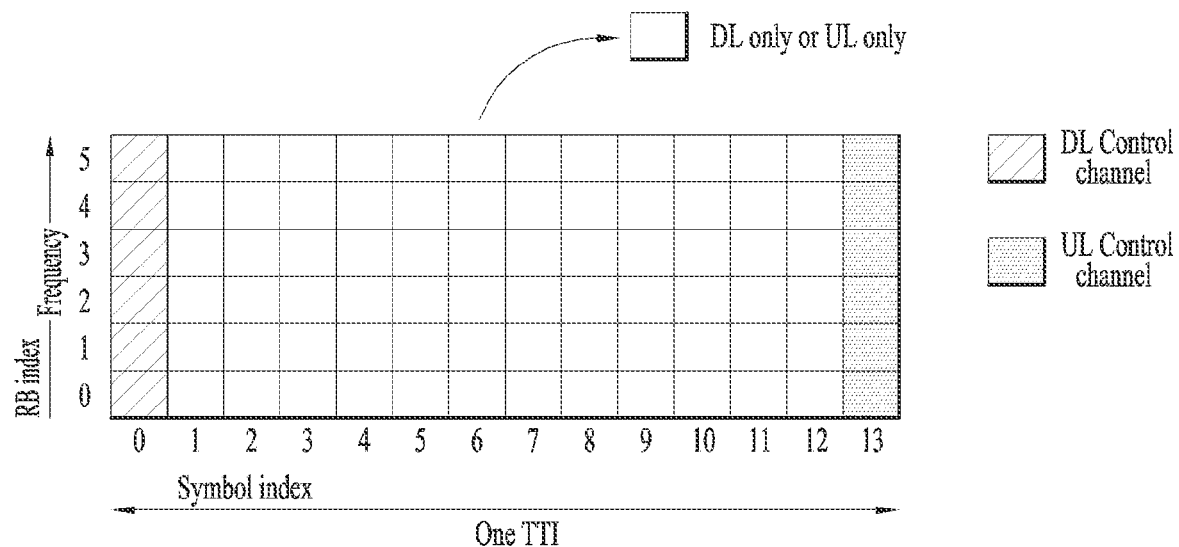
FIG. 4 is a view illustrating an exemplary slot structure available in new radio access technology (NR).

An SS will be described in more detail with reference to FIG. 3. An SS is categorized into a primary synchronization signal (PSS) and a secondary synchronization signal (SSS). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether a normal CP or an extended is used). Referring to FIG. 4, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 3, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit cyclic redundancy check (CRC) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present invention.

Step 1: RACH preamble (via PRACH) (UE to eNB)
Step 2: Random access response (RAR) (via PDCCH and PDSCH (eNB to)
Step 3: Layer 2/Layer 3 message (via PUSCH) (UE to eNB)
Step 4: Contention resolution message (eNB to UE)

On the other hand, the dedicated random access procedure includes 3 steps described in the following. Messages transmitted via the 3 steps can be respectively referred to as message (Msg) 0 to 2 in the present invention. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)
Step 1: RACH preamble (via PRACH) (UE to eNB)
Step 2: Random access response (RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In the LTE/LTE-A system, a subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

<OFDM Numerology>

A New RAT system adopts an OFDM transmission scheme or a transmission scheme similar to the OFDM transmission scheme. The New RAT system may use different OFDM parameters from LTE OFDM parameters. Or the New RAT system may follow the numerology of legacy LTE/LTE-A but have a larger system bandwidth (e.g., 100 MHz). Or one cell may support a plurality of numerologies. That is, UEs operating with different numerologies may co-exist within one cell.

<Subframe Structure>

In the 3GPP LTE/LTE-A system, a radio frame is 10 ms ($307200T_s$) long, including 10 equal-size subframes (SFs). The 10 SFs of one radio frame may be assigned numbers. $T_s$ represents a sampling time and is expressed as $T_s=1/(2048*15 kHz)$. Each SF is 1 ms, including two slots. The 20 slots of one radio frame may be sequentially numbered from 0 to 19. Each slot has a length of 0.5 ms. A time taken to transmit one SF is defined as a transmission time interval (TTI). A time resource may be distinguished by a radio frame number (or radio frame index), an SF number (or SF index), a slot number (or slot index), and so on. A TTI refers to an interval in which data may be scheduled. In the current LTE/LTE-A system, for example, there is a UL grant or DL grant transmission opportunity every 1 ms, without a plurality of UL/DL grant opportunities for a shorter time than 1 ms. Accordingly, a TTI is 1 ms in the legacy LTE/LTE-A system.

FIG. 4 illustrates an exemplary slot structure available in the new radio access technology (NR).

To minimize a data transmission delay, a slot structure in which a control channel and a data channel are multiplexed in time division multiplexing (TDM) is considered in $5^{th}$ generation (5G) NR.

In FIG. 4, an area marked with slanted lines represents a transmission region of a DL control channel (e.g., PDCCH) carrying DCI, and a black part represents a transmission region of a UL control channel (e.g., PUCCH) carrying UCI. DCI is control information that a gNB transmits to a UE and may include information about a cell configuration that a UE should know, DL-specific information such as DL scheduling, and UL-specific information such as a UL grant. Further, UCI is control information that a UE transmits to a gNB. The UCI may include an HARQ ACK/NACK report for DL data, a CSI report for a DL channel state, a scheduling request (SR), and so on.

In FIG. 4, symbols with symbol index 1 to symbol index 12 may be used for transmission of a physical channel (e.g., PDSCH) carrying DL data, and also for transmission of a physical channel (e.g., PUSCH) carrying UL data. According to the slot structure illustrated in FIG. 2, as DL transmission and UL transmission take place sequentially in one slot, transmission/reception of DL data and reception/transmission of a UL ACK/NACK for the DL data may be performed in the one slot. As a consequence, when an error is generated during data transmission, a time taken for a data retransmission may be reduced, thereby minimizing the delay of a final data transmission.

In this slot structure, a time gap is required to allow a gNB and a UE to switch from a transmission mode to a reception mode or from the reception mode to the transmission mode. For the switching between the transmission mode and the reception mode, some OFDM symbol corresponding to a DL-to-UL switching time is configured as a guard period (GP) in the slot structure.

In the legacy LTE/LTE-A system, a DL control channel is multiplexed with a data channel in TDM, and a control channel, PDCCH is transmitted distributed across a total system band. In NR, however, it is expected that the bandwidth of one system will be at least about 100 MHz, which makes it inviable to transmit a control channel across a total band. If a UE monitors the total band to receive a DL control channel, for data transmission/reception, this may increase the battery consumption of the UE and decrease efficiency. Therefore, a DL control channel may be transmitted localized or distributed in some frequency band within a system band, that is, a channel band in the present disclosure.

In the NR system, a basic transmission unit is a slot. A slot duration includes 14 symbols each having a normal cyclic prefix (CP), or 12 symbols each having an extended CP. Further, a slot is scaled in time by a function of a used subcarrier spacing. That is, as the subcarrier spacing increases, the length of a slot decreases. For example, given 14 symbols per slot, if the number of slots in a 10-ms frame is 10 for a subcarrier spacing of 15 kHz, the number of slots is 20 for a subcarrier spacing of 30 kHz, and 40 for a subcarrier spacing of 60 kHz. As the subcarrier spacing increases, the length of an OFDM symbol decreases. The number of OFDM symbols per slot is different depending on the normal CP or the extended CP and does not change according to a subcarrier spacing. The basic time unit for LTE, $T_s$ is defined as $1/(15000*2048)$ seconds, in consideration of the basic 15-kHz subcarrier spacing and a maximum FFT size of 2048. $T_s$ is also a sampling time for the 15-kHz subcarrier spacing. In the NR system, many other subcarrier spacings than 15 kHz are available, and since a subcarrier spacing is inversely proportional to a corresponding time length, an actual sampling time $T_s$ corresponding to subcarrier spacings larger than 15 kHz becomes shorter than $1/(15000*2048)$ seconds. For example, the actual sampling time for the subcarrier spacings of 30 kHz, 60 kHz, and 120 kHz may be $1/(2*15000*2048)$ seconds, $1/(4*15000*2048)$ seconds, and $1/(8*15000*2048)$ seconds, respectively.

<Analog Beamforming>

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Figure 5:
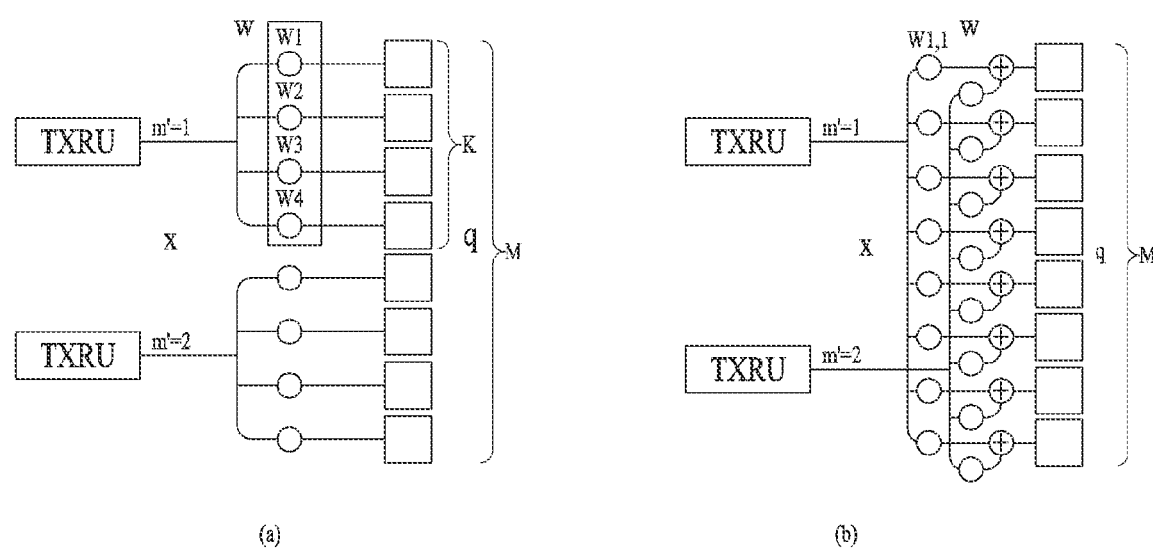
FIG. 5 is a view illustrating exemplary connection schemes between transceiver units (TXRUs) and antenna elements.

FIG. 5 is a view illustrating exemplary connection schemes between TXRUs and antenna elements.

(a) of FIG. 5 illustrates connection between a TXRU and a sub-array. In this case, an antenna element is connected only to one TXRU. In contrast, (b) of FIG. 5 illustrates connection between a TXRU and all antenna elements. In this case, an antenna element is connected to all TXRUs. In FIG. 5, W represents a phase vector subjected to multiplication in an analog phase shifter. That is, a direction of analog beamforming is determined by W. Herein, CSI-RS antenna ports may be mapped to TXRUs in a one-to-one or one-to-many correspondence.

As mentioned before, since a digital baseband signal to be transmitted or a received digital baseband signal is subjected to a signal process in digital beamforming, a signal may be transmitted or received in or from a plurality of directions on multiple beams. In contrast, in analog beamforming, an analog signal to be transmitted or a received analog signal is subjected to beamforming in a modulated state. Thus, signals cannot be transmitted or received simultaneously in or from a plurality of directions beyond the coverage of one beam. A gNB generally communicates with multiple users at the same time, relying on the wideband transmission or multiple antenna property. If the gNB uses analog BF or hybrid BF and forms an analog beam in one beam direction, the gNB has no way other than to communicate only with users covered in the same analog beam direction in view of the nature of analog BF. A later-described RACH resource allocation and gNB resource utilization scheme according to the present invention is proposed by reflecting limitations caused by the nature of analog BF or hybrid BF.

<Hybrid Analog Beamforming>

Figure 6:
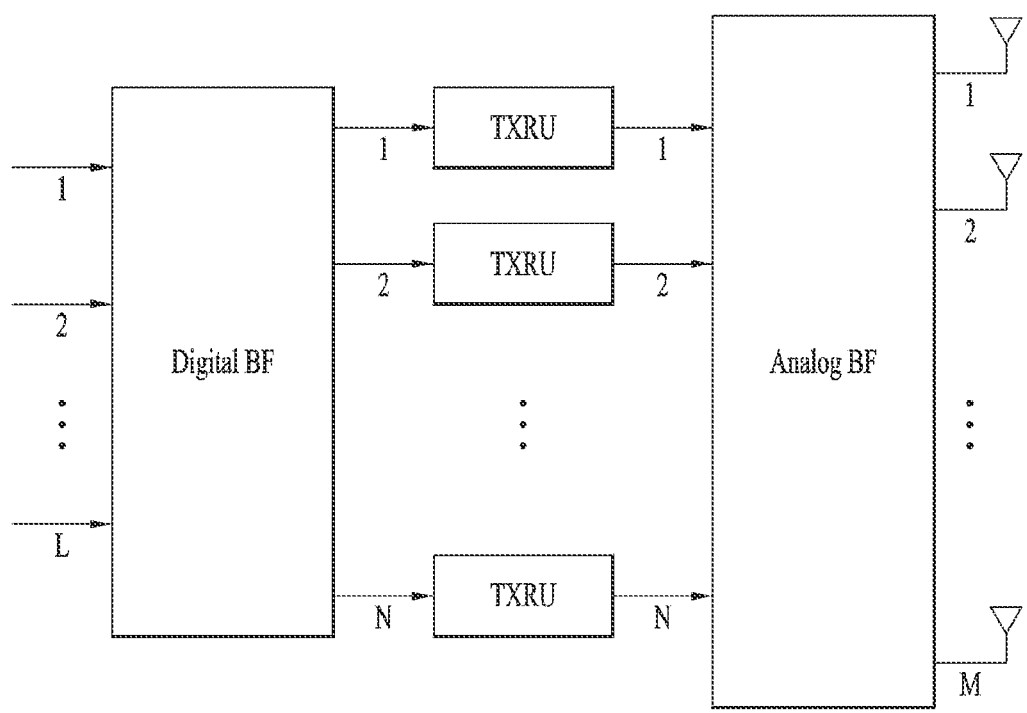
FIG. 6 is a view abstractly illustrating a hybrid beamforming structure in terms of TXRUs and physical antennas.

FIG. 6 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 6, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 7:
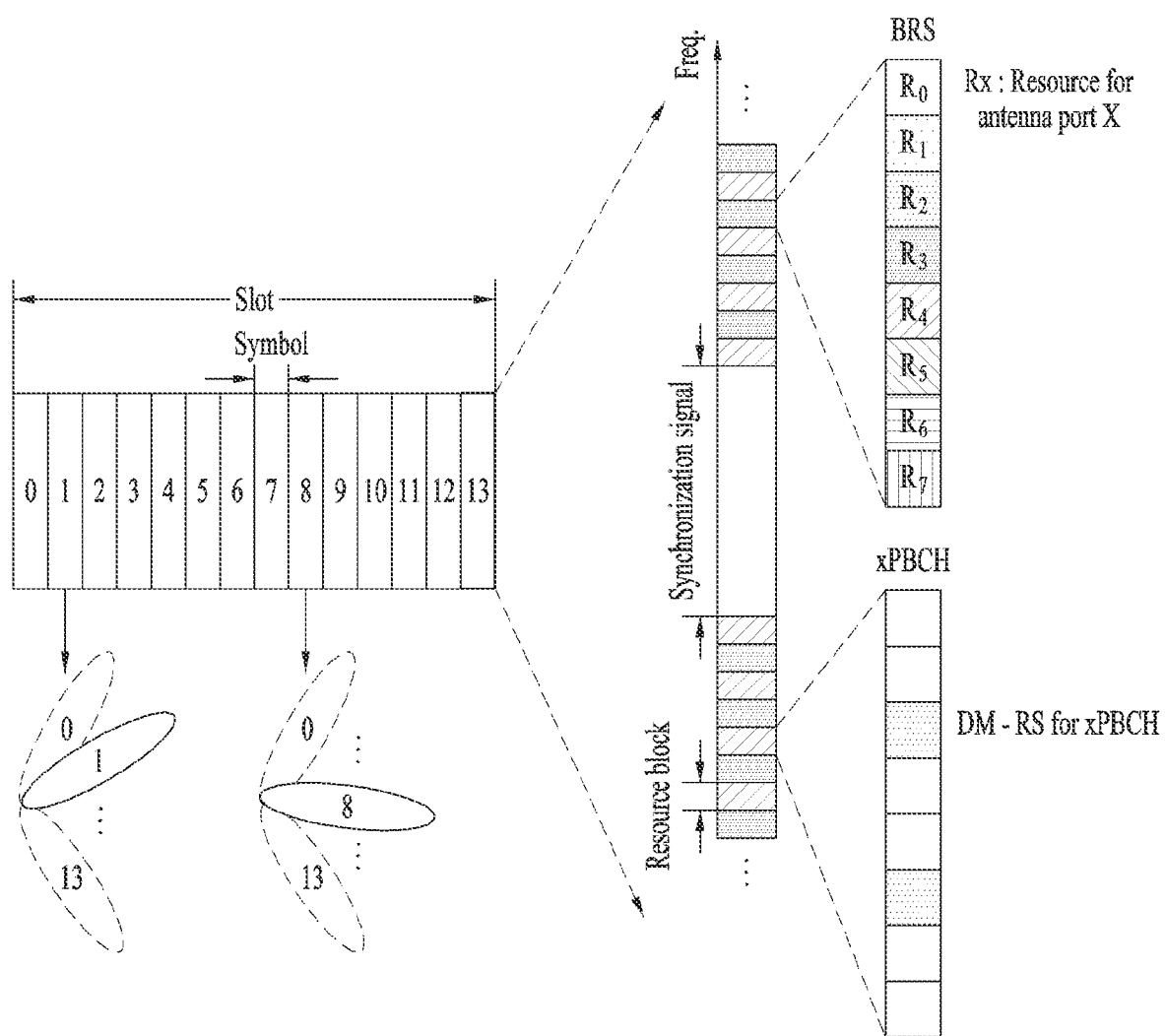
FIG. 7 is a view illustrating beam sweeping for a synchronization signal and system information during downlink (DL) transmission.

FIG. 7 is a view illustrating beam sweeping for an SS and system information during DL transmission. In FIG. 7, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 7 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 8:
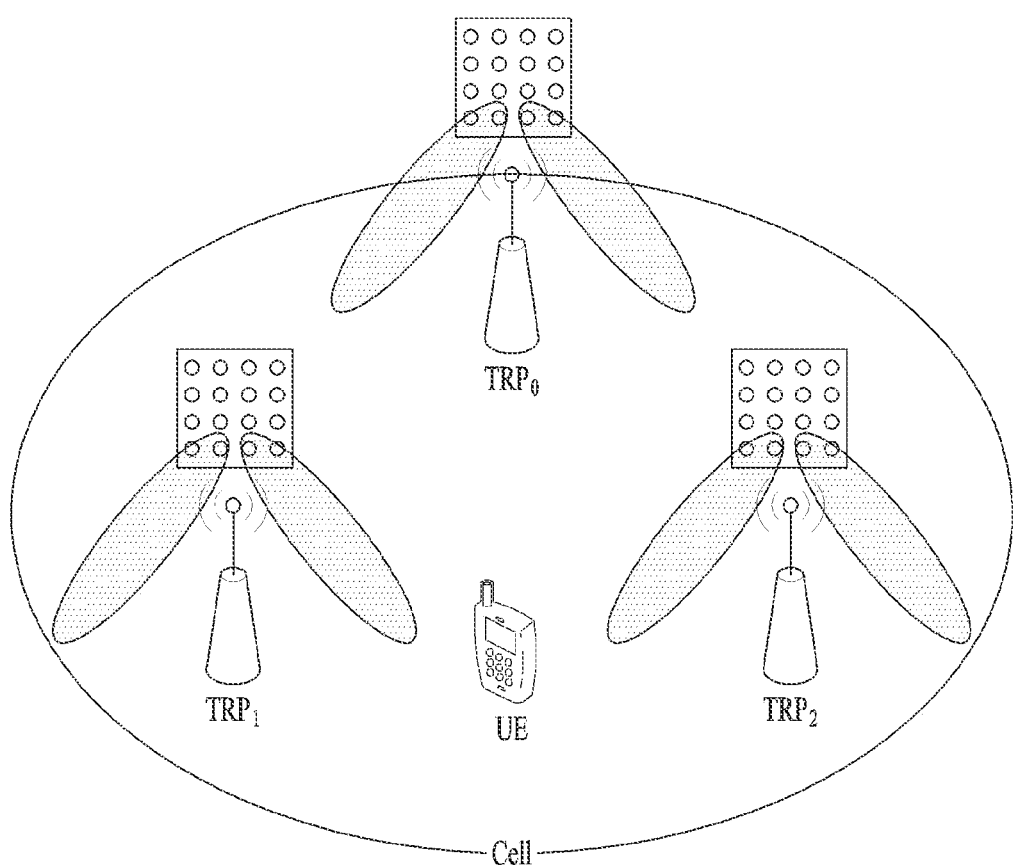
FIG. 8 is a view illustrating an exemplary cell in an NR system.

FIG. 8 is a view illustrating an exemplary cell in the NR system.

Referring to FIG. 8, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Hereinafter, a description will be given of a method of generating a synchronization signal and a method of scrambling a PBCH included in a synchronization signal according to embodiments of the present disclosure.

Before describing the present disclosure in detail, it should be noted that each of the 'upper bit' and 'uppermost bit' mentioned in the present specification may mean a left bit of an information bit string where the highest order number is located at the far right end. That is, it could be interpreted as the Least Significant Bit (LBS) corresponding to a unit value for determining whether a value indicated by each information bit is either an even or odd integer number in an information bit string where the highest order number is located at the far left end.

Similarly, each of the 'lower bit' and 'lowermost bit' may mean a right bit of an information bit string where the highest order number is located at the far right end. In other words, it could be interpreted as the Most Significant Bit (MSB) of an information bit string where the highest order number is located at the far left end.

For example, the following statement is included in the present specification: "total 10 bits of SFN information can be configured by obtaining upper N bits of an SFN (e.g., S0, S1, and S2) and obtaining the rest of the SFN information, i.e., the remaining (10-N) bits from PBCH contents."

More specifically, in the case of an information bit string of which bits are arranged such that the highest order number is located at the far right end, for example, in the case of the following information bit string: (S0 S1 S2 S3 . . . S9), the 'upper N bits' mean left N bits (e.g., S0, S1, and S2), and the 'remaining (10-N) bits' mean right (10-N) bits (e.g., S3 to S9). This can be represented using the LSB and MSB. For example, assuming that an information bit string is configured as follows: (S9 S8 S7 . . . S1 S0), when the 'upper N bits' are expressed by LSB N bits, the information bit string could be represented as (S2 S1 S0). And, when the 'remaining (10-N) bits' are expressed by MSB (10-N) bits, the bit string could be represented as (S9 S8 S7 . . . S3).

1. System Frame Number, Half Frame Boundary

Lower N bits of SFN information are transmitted via a PBCH payload, and upper M bits are transmitted as a scrambling sequence. Meanwhile, the most significant 1 bit among the upper M bits of the SFN information may be transmitted by changing the time/frequency location of a PBCH DMRS, NR-SSS, or SS block. In addition, information on the boundary of a half radio frame (5 ms) may also be transmitted by changing the time/frequency location of the PBCH DMRS, NR-SSS, or SS block Herein, each of the 'upper bit' and 'uppermost bit' means a left bit of an information bit string where the highest order number is located at the far right end. That is, it could be interpreted as the Least Significant Bit (LBS) corresponding to a unit value for determining whether an integer is either even or odd in an information bit string where the highest order number is located at the far left end.

In addition, each of the 'lower bit' and 'lowermost bit' may mean a right bit of an information bit string where the highest order number is located at the far right end. It could be interpreted as the Most Significant Bit (MSB) of an information bit string where the highest order number is located at the far left end.

Embodiment 1-1

If contents transmitted on an NR-PBCH included in a specific SS block vary every 80 ms, the NR-PBCH contents includes information that does not change within 80 ms. For example, during a PBCH TTI (80 ms), the same SFN information is included in the PBCH contents. To this end, lower 7-bit information of 10-bit SFN information may be included in the PBCH contents, and upper 3-bit information for identifying a frame boundary (10 ms) may be included in a PBCH scrambling sequence or the like.

Embodiment 1-2

If contents transmitted on an NR-PBCH included in a specific SS block vary every 80 ms, the NR-PBCH contents includes information that does not change within 80 ms. For example, during a PBCH TTI (80 ms), the same SFN information is included in the PBCH contents. To this end, lower 7-bit information of 10-bit SFN information may be included in the PBCH contents, and lower 2-bit information of upper 3-bit information for identifying a frame boundary (10 ms) may be included in a PBCH scrambling sequence, and the most significant 1-bit information is transmitted using a signal or channel different from that used for PBCH channel coding including PBCH contents, a CRC, a scrambling sequence, etc. For example, a PBCH DMRS may be used as the signal different from that used for the PBCH channel coding. And, a DMRS sequence, DMRS RE location, change in DMRS sequence to RE mapping, change in symbol locations in an SS block, change in the frequency location of an SS block, etc. may be used as information.

Specifically, when the DMRS sequence is used, a method of using a phase difference between two OFDM symbols in which the DMRS is transmitted, for example, orthogonal code cover may be considered. In addition, when the DMRS sequence is used, a method of changing an initial value may also be considered. In detail, if the initial value of one m-sequence of two m-sequences used as a Gold sequence is fixed and the initial value of the other m-sequence is changed using a cell-ID and other information, a method of changing an initial value by adding information to be transmitted to the m-sequence having the fixed initial value may be introduced.

More specifically, a method of changing two initial values on a 10 ms basis during a period of 20 ms may be considered by introducing an additional initial value (e.g., [0 1 0 . . . 0]) different from a previously fixed initial value (e.g., [1 0 0 . . . 0]) based on 1-bit information indicating a boundary of 10 ms. As another method, a method of using the initial value of one m-sequence as it is and adding information to be transmitted to the initial value of the other m-sequence may be considered.

In addition, when the DMRS RE location is used, the V-shift method where the location of a frequency axis varies depending on information may be applied. Specifically, when transmission is performed at 0 ms and 10 ms during a period of 20 ms, the RE location is differently configured. Assuming that a DMRS is allocated every four REs, a method of performing shifting on a 2-RE basis may be considered.

Moreover, a method of changing PBCH DMRS sequence to RE mapping may be applied. Specifically, a sequence is mapped from the first RE at 0 ms, but at 10 ms, a different mapping method may be applied. For example, the sequence may be mapped to the first RE in the opposite direction, the sequence may be mapped from the center RE of the first OFDM symbol, or the sequence may be mapped from the first RE of the second OFDM symbol. Further, a method of changing the order of arrangement in an SS block, i.e., PSS-PBCH-SSS-PBCH arrangement may be considered. For example, although signals are basically arranged in the following order: PBCH-PSS-SSS-PBCH, different arrangement methods may be applied at 0 and 10 ms, respectively. Additionally, a method of changing the location of an RE to which PBCH data is mapped in an SS block may be applied as well.

Embodiment 1-3

1-bit information indicating a half fame boundary can be transmitted using a signal or channel different from that used for PBCH channel coding including PBCH contents, a CRC, a scrambling sequence, etc. For example, a PBCH DMRS may be used as the signal different from that used for the PBCH channel coding as described in Embodiment 1-2. In addition, a DMRS sequence, DMRS RE location, change in DMRS sequence to RE mapping, change in symbol locations in an SS block, change in the frequency location of an SS block, etc. may be used as information. In particular, this configuration may be applied when the 10 ms range is switched into the boundaries of 0 and 5 ms.

In addition, similar to the method described in Embodiment 1-2, a DMRS sequence, DMRS RE location, change in DMRS sequence to RE mapping, change in symbol locations in an SS block, change in the frequency location of an SS block, etc. may be used for time change information indicating that the range of 20 ms including the half frame boundary information and the SFN most significant 1-bit information is divided into 5 ms units. This configuration may be applied when the time information is changed such that the 20 ms range is switched into the boundaries of 0, 5, 10, and 15 ms.

Embodiment 1-4

In Embodiment 1-4, each of the 'upper bit' and 'uppermost bit' means a left bit of an information bit string where the highest order number is located at the far right end. It could be interpreted as the Least Significant Bit (LBS) corresponding to a unit value for determining whether an integer is either even or odd in an information bit string where the highest order number is located at the far left end.

In addition, each of the 'lower bit' and 'lowermost bit' may mean a right bit of an information bit string where the highest order number is located at the far right end. It could be interpreted as the Most Significant Bit (MSB) of an information bit string where the highest order number is located at the far left end.

When one PBCH is composed of a total of N REs, M REs (where M<N) are allocated for PBCH data transmission. In this case, if QPSK modulation is applied, the length of a scrambling sequence becomes 2*M. In addition, a total of L different scrambling sequences each having a length of 2*M may be created as follows. First, a long sequence with a length of L*2*M is generated, and the long sequence is divided into 2*M units. By doing so, the L sequences may be generated. As a scrambling sequence, not only a PN sequence but also a Gold sequence and an M sequence may be used. In particular, the Gold sequence with 31-length may be used. A cell ID is at least used as a value for initializing the PN sequence. In addition to the cell ID, an SS block index obtained from a PBCH DMRS may also be used. When a slot number and OFDM symbols are derived from the SS block index, the slot number/OFDM symbol numbers may be used. Moreover, half radio frame boundary information may be used as an initialization value. Further, if some bits of SFN information can be obtained from a signal or channel different from that used for channel coding including contents, scrambling sequences, etc., the corresponding SFN information may be used as the initialization value of a scrambling sequence.

The length of the scrambling sequence is determined according to the number of bits transmitted through the scrambling sequence in the SFN information. For example, if 3-bit information is transmitted through the scrambling sequence, it can represent 8 states. To this end, a sequence with a total length of 8*2*M is required. Similarly, if 2-bit information is transmitted, a sequence with a total length of 2*2*M is required.

A bit string including PBCH contents and a CRC is encoded using a polar code so that encoded bits with 512-length are created. The length of the encoded bits is shorter than that of the scrambling sequence. The length of the bit string may be equal to that of the scrambling sequence by repeating the 512-length encoded bits several times. Thereafter, the repeated encoded bits are multiplied with the scrambling sequence, and then QPSK modulation is performed thereon. The modulated symbol is divided into units, each of which having a length of M and then mapped to PBCH REs.

Figure 9:
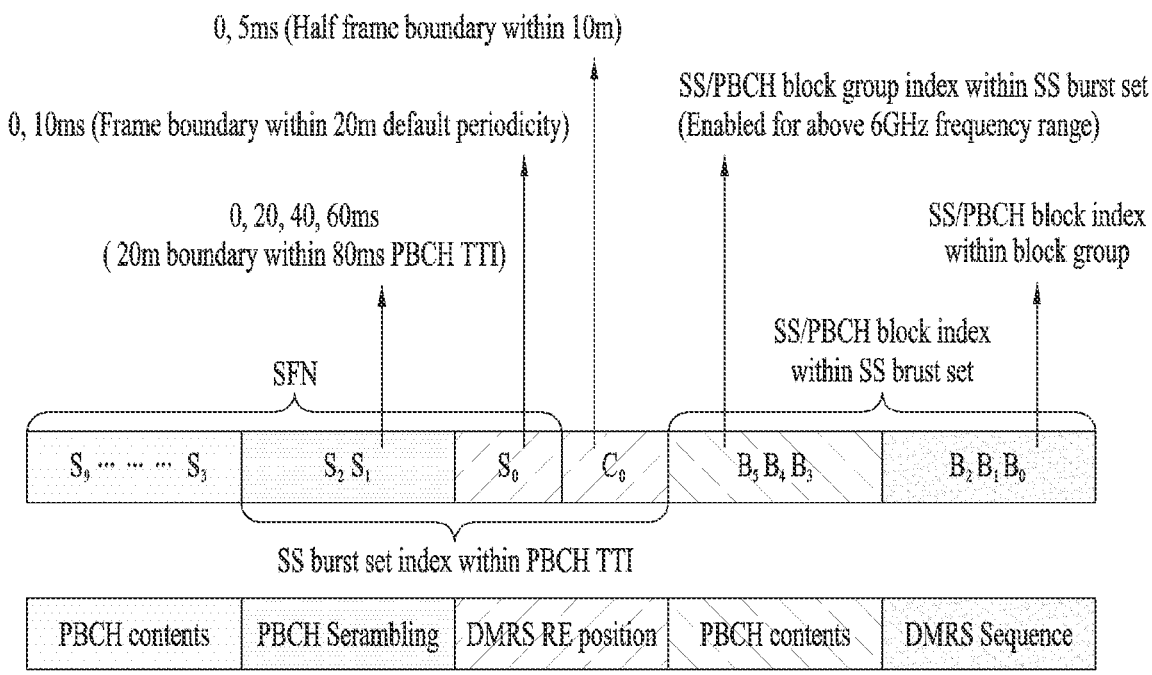
FIGS. 9 to 12 illustrate methods of indexing a synchronization signal and indicating the synchronization signal index, an SFN, and a half frame.

For example, referring to FIG. 9, when 3-bit information of SFN information is transmitted through a scrambling sequence, a modulated symbol sequence with a length of M is transmitted every 10 ms in order to change the scrambling sequence every 10 ms. In this case, a different modulated symbol is transmitted every 10 ms. If an SS burst set has a periodicity of 5 ms, the same modulated symbol sequence is transmitted during two 5 ms transmission periods included in the range of 10 ms. If a UE is able to obtain boundary information of a half radio frame (5 ms), the UE can combine information of PBCHs transmitted two times during 10 ms. In addition, the UE performs blind decoding 8 times to obtain 8 scrambling sequences, which are transmitted every 10 ms during 80 ms. In this case, the UE obtains 1-bit half frame boundary information (e.g., C0) by decoding another channel rather than the PBCH. And, the UE obtains upper N-bit information (e.g., S0, S1, and S2) of the SFN information by performing PBCH blind decoding and then obtains the rest of the SFN information corresponding to the remaining (10-N) bits (e.g., S3 to S9) from PBCH contents, thereby configuring the total 10 bits of the SFN information.

As another example, when 3-bit information of SFN information is transmitted through a scrambling sequence and half frame boundary information is included in PBCH contents, the same contents are included during a transmission period of 10 ms. However, in the case of the PBCH contents with an offset of 5 ms, since the 1-bit half frame boundary information varies, different contents may be transmitted every 5 ms. In other words, two types of contents are configured due to the 1-bit half frame boundary information, and a gNB encodes each of the two types of contents and then performs bit repetition, scrambling, modulation, etc. on each of them.

If a UE fails to obtain the 5 ms boundary information, it is difficult for the UE to combine signals transmitted every 5 ms. Instead, the UE equally performs the blind decoding, which is performed 8 times every 10 ms, even for the 5 ms offset. That is, the UE obtains the upper N-bit information (e.g., S0, S1, and S2) of the SFN information by performing the blind decoding at least 8 times and then obtains not only the rest of the SFN information corresponding to the remaining (10-N) bits (e.g., S3 to S9) from the PBCH contents but also the 1-bit half radio frame boundary information (e.g., C0). In other words, the UE may obtain time information per 5 ms by arranging the obtained bit information.

Similarly, when 2-bit information of SFN information is transmitted through a scrambling sequence, the scrambling sequence varies every 20 ms, and the same modulated symbol sequence is transmitted during four 5 ms transmission periods included in the range of 20 ms. If a UE is able to obtain half frame boundary information and the most significant 1-bit information of an SFN, the UE can combine 4 PBCHs received during 20 ms and thus perform blind decoding four times every 20 ms. In this case, although the reception complexity of the UE may increase due to the acquisition of the half frame boundary information and the MSB information of the SFN, the complexity of PBCH blind decoding may decrease and the PBCH combination can be performed at most 16 times so that it is expected that the detection performance can be improved. In this case, the UE obtains the 1-bit half frame boundary information (e.g., C0) and the most significant 1-bit information of the SFN (e.g., S0) by decoding another channel rather than the PBCH.

By performing the PBCH blind decoding, the UE obtains upper (N−1)-bit information (e.g., S1 and S2) behind the most significant 1 bit of the SFN and then obtains the rest of the SFN information corresponding to the remaining (10-N) bits (e.g., S3 to S9) from PBCH contents. By doing so, the half radio frame boundary information (e.g., C0) and the total 10 bits of the SFN information (e.g., S0 to S9) are configured, and the obtained time information is provided on a 5 ms basis. In this case, multiple SS blocks may be transmitted during 5 ms, the locations of the SS blocks may be obtained from a PBCH DMRS and the PBCH contents during 5 ms.

Meanwhile, when 2-bit information (e.g., S1 and S2) of SFN information is transmitted through a scrambling sequence and the most significant 1-bit information (e.g., S0) of the SFN information and 1-bit half frame boundary information (e.g., C0) is provided by PBCH contents, if the PBCH contents vary every 5 ms during a period of 20 ms, four information bit sets (e.g., S0 and C0) are generated, and channel coding is performed for each of the information bit sets.

As a further example, 10-bit SFN information and 1-bit half frame boundary information may be included in PBCH contents. In this case, the rest of the PBCH contents except upper 3-bit information (e.g., S0, S1, and S2) of the SFN information and the 1-bit half frame boundary information does not vary during a PBCH TTI (e.g., 80 ms). However, the upper 3-bit information (e.g., S0, S1, and S2) of the SFN information and the 1-bit half frame boundary information varies per 5 ms. Therefore, 16 PBCH information bit sets may be generated during the PBCH TTI (e.g., 80 ms).

In addition, a scrambling sequence is applied to a CRC and information bits except some bits (e.g., S1 and S2) of SFN information among information bits included in a PBCH payload. In this case, a PN sequence such as a Gold sequence may be used as the scrambling sequence. In addition, the scrambling sequence may be initialized by a cell ID.

Meanwhile, assuming that the number of scrambled bits is M, a sequence with a length of M*N may be generated and divided into N sequences each having a length of M such that each sequence has no overlapping elements. An M-length sequence may be used as a scrambling sequence for each of the N sequences according to the order in which some bits (e.g., S1 and S2) of SNF information are changed as shown in the following example.

Example

When (S2, S1)=(0, 0), a sequence string from 0 to M−1 is used as the scrambling sequence.
When (S2, S1)=(0, 1), a sequence string from M to 2M−1 is used as the scrambling sequence.
When (S2, S1)=(1, 0), a sequence string from 2M to 3M−1 is used as the scrambling sequence.
When (S2, S1)=(1, 1), a sequence string from 3M to 4M−1 is used as the scrambling sequence.

As described above, one same scrambling sequence is used for four PBCH information bit sets transmitted during a period of 20 ms among the 16 PBCH information bit sets generated during the PBCH TTI (e.g., 80 ms). In addition, a scrambling sequence different from that used for the transmitted four PBCH information bit sets is used for four PBCH information bit sets which will be transmitted during a next period of 20 ms.

Thereafter, channel coding is performed for each of the 16 PBCH information bit sets where scrambling is performed using scrambling sequences as described above, and second scrambling sequences are applied to bits encoded by the channel coding. In other words, the scrambling is performed by applying the first scrambling sequences to the 16 PBCH information bit sets, the channel coding is performed, and then the scrambling sequences are applied to the encoded bits obtained by the channel coding. In this case, a PN sequence such as a Gold sequence is used as the second scrambling sequence, and the second scrambling sequence may be initialized by a cell ID and a 3-bit SS block index transmitted via a PBCH DMRS.

Depending on the transmission time, one same scrambling sequence may be applied to encoded bits of PBCH contents transmitted in association with a specific SS block index.

Meanwhile, a scrambling sequence may be segmented into 5 ms units, and a segmented scrambling sequence may be applied depending on the half frame boundary information. For example, assuming that the number of scrambled encoded bits is K, a sequence with a length of 2*K may be generated and divided into 2 sequences each having a length of K such that each sequence has no overlapping elements. Thereafter, each sequence may be applied to the half frame boundary information. According to this method, when soft combining is applied to a PBCH transmitted during a period of 10 ms, interference can be randomly distributed, thereby improving performance.

In addition, if there is no information on a candidate sequence for the second scrambling sequence, a UE may perform decoding several times on the assumption that an available scrambling sequence is transmitted as the candidate sequence.

Moreover, 1-bit half frame boundary information may be transmitted using a signal and/or channel different from that used of PBCH channel coding including PBCH contents, a CRC, a scrambling sequence, etc.

For example, the 1-bit half frame boundary information may be transmitted using a PBCH DMRS. In addition to the PBCH DMRS, the 1-bit half frame boundary information may be transmitted using a DMRS sequence, DMRS RE position, change in DMRS sequence to RE mapping, change in DMRS sequence to RE mapping order, change in the locations of symbols for a PSS/SSS/PBCH in an SS block, change in the frequency location of an SS block, polarity conversion of an SS or PBCH OFDM symbol, etc. Details will be described later.

If a UE obtains the half frame boundary information before performing PBCH decoding, the UE may perform de-scrambling using a scrambling sequence corresponding to the obtained half frame boundary information.

2. SS Block Time Index

In this section, a method of indicating an SS block time index will be described.

Some SS block time indices are transmitted through a PBCH DMRS sequence, and the remaining indices are transmitted through a PBCH payload. In this case, the SS block time indices transmitted through the PBCH DMRS sequence correspond to N-bit information, and the SS block time indices transmitted through the PBCH payload correspond to M-bit information. Assuming that the maximum number of SS blocks in a certain frequency range is L, L bits are the sum of M bits and N bits. In addition, assuming that total H (where H=2^L) states that can be transmitted during a period of 5 ms are defined as group A, J (where J=2^N) states that can be represented by the N bits transmitted through the PBCH DMRS sequence are defined as group B, and I (where I=2^M) states that can be represented by the M bits transmitted through the PBCH payload are defined as group C, the number H of states of group A may be represented as the product of the number J of states of group B and the number C of states of group C. In this case, as the states belonging to either group B or C, a maximum of P states (where P is either 1 or 2) can be represented during a period of 0.5 ms. The above-described groups are merely for convenience of description, and the present disclosure may include various types of groups.

Meanwhile, the number of states transmitted through the PBCH DMRS sequence is 4 in a frequency range below 3 GHz, 8 in a frequency range from 3 GHz to 6 GHz, and 8 in a frequency range above 6 GHz. In frequency bands below 6 GHz, subcarrier spacing of 15 kHz and 30 kHz is used. In this case, if the subcarrier spacing of 15 kHz is used, a maximum of one state is included within the period of 0.5 ms. If the subcarrier spacing of 30 kHz is used, a maximum of two states are included within the period of 0.5 ms. In frequency bands above 6 GHz, subcarrier spacing of 120 kHz and 240 kHz is used. In this case, if the subcarrier spacing of 120 kHz is used, a maximum of one state is included within the period of 0.5 ms. If the subcarrier spacing of 240 kHz is used, a maximum of two states are included within the period of 0.5 ms.

Figure 10:
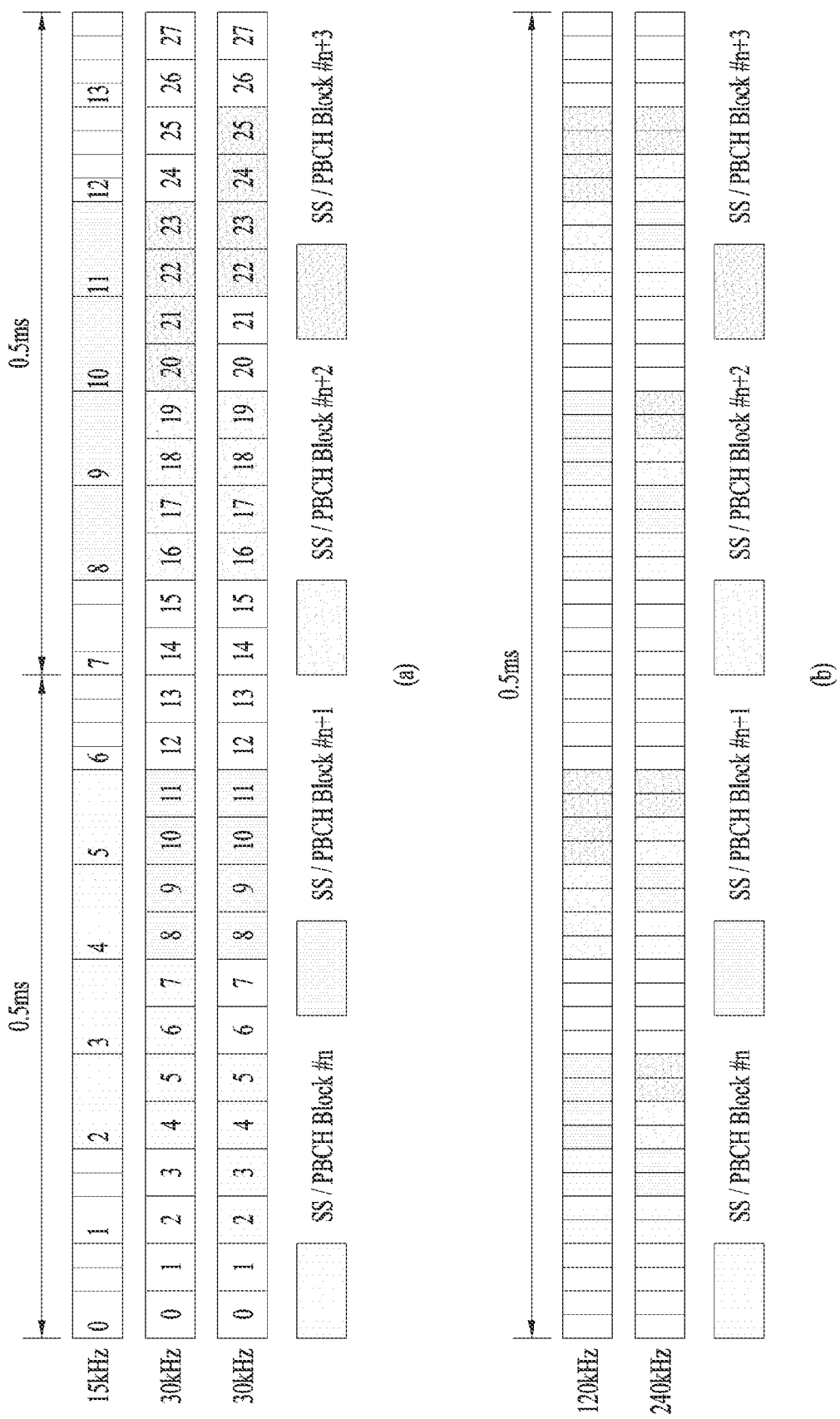

FIG. 10 (*a*) shows SS blocks included during a period of 0.5 ms when subcarrier spacing of 15/30 kHz is used, and FIG. 10 (*b*) shows SS blocks included during a period of 0.5 ms when subcarrier spacing of 120/240 kHz is used. As shown in FIG. 10, when the subcarrier spacing is 15, 30, 120, and 240 kHz, 1, 2, 8, 16 SS blocks are included during the period of 0.5 ms, respectively.

When the subcarrier spacing is 15 or 30 kHz, the indices of the SS blocks included during the period of 0.5 ms are one-to-one mapped to indices transmitted through a PBCH DMRS sequence. Indication bits for indicating SS block indices may be included in a PBCH payload. In frequency bands below 6 GHz, these bits may be used for other purposes rather than as the bits for the SS block indices. For example, the bits may be used to extend coverage or inform the number of repetitions of a signal or resource associated with an SS block.

When the PBCH DMRS sequence is initialized using a cell ID and an SS block index, if the subcarrier spacing is 15 or 30 kHz, an SS block index transmitted during a period of 5 ms may be used as the initial value of the sequence. Herein, an SS block index may mean an SSBID.

Embodiment 2-1

When the subcarrier spacing is 120 kHz, 8 SS block indices are included during a period of 0.5 ms. During the period of 0.5 ms, the same PBCH DMRS sequence is used, but the PBCH payload may vary depending on the SS block index. However, a PBCH DMRS sequence used during a period of 0.5 ms where a first SS block group is transmitted is different from that used during a previous 0.5 ms period for a second SS block group, which was transmitted before the first SS block group. In addition, to distinguish between SS blocks transmitted during different 0.5 ms periods, the SS block index for an SS block group is transmitted via the PBCH payload.

When the subcarrier spacing is 240 kHz, 16 SS block indices are included during a period of 0.5 ms, and two PBCH DMRS sequences exist during the period of 0.5 ms. In other words, a PBCH DMRS sequence used for 8 SS blocks among SS blocks during the first half of 0.5 ms may be different from that used for the other 8 SS blocks during the second half of 0.5 ms. The SS block indices are transmitted through the PBCH payload included in the SS blocks during the first and second half of the period.

When such a method of maintaining a PBCH DMRS sequence during a predetermined time period is applied, a UE can apply a time information transmission method based on a PBCH DMRS sequence with low detection complexity and high detection performance when attempting to detect a signal from a neighbor cell to secure time information of the neighbor cell. Thus, the method is advantageous in that time information can be obtained with an accuracy of about 0.5 or 0.25 ms. In addition, it is also advantageous in that a time accuracy of about 0.5 or 0.25 ms can be provided.

Embodiment 2-2

When the subcarrier spacing is 120 kHz, 8 SS block indices are included during a period of 0.5 ms. During the period of 0.5 ms, the same SS block index is included in the PBCH payload, but the PBCH DMRS sequence may vary according to the SS block index. However, an SS block index transmitted through the PBCH payload during a 0.5 ms period where a first SS block group is transmitted is different from that used during a 0.5 ms period for a second SS block group, which was transmitted before the first SS block group.

When the subcarrier spacing is 240 kHz, 16 SS block indices are included during a period of 0.5 ms. During the period of 0.5 ms, two SS block indices may be transmitted through the PBCH payload. That is, during the first half of 0.5 ms, the same SS block index is included in the PBCH payload transmitted in 8 SS blocks among 16 SS blocks, and during the second half of 0.5 ms, 8 SS block indices are different from each other, unlike the SS block index during the first half period. In this case, the PBCH DMRS included in each of the first and second half periods uses a different sequence depending on the SS block index.

When the subcarrier spacing is 120 or 240 kHz, the SS block index is expressed by combining indices obtained from two paths. In Embodiment 2-1, the SS block index can be calculated as shown in Equation 1, and in Embodiment 2-2, the SS block index can be calculated as shown in Equation 2.

$$\text{SS-PBCH block index} = \text{SSBID} * P + \text{SSBGID}$$

$$\text{SSBID} = \text{Floor}(\text{SS-PBCH block index}/P)$$

$$\text{SSBGID} = \text{Mod}(\text{SS-PBCH block index}, P) \quad \text{[Equation 1]}$$

$$\text{SS-PBCH block index} = \text{SSBID} * P + \text{SSBGID}$$

$$\text{SSBID} = \text{Mod}(\text{SS-PBCH block index}, P)$$

$$\text{SSBGID} = \text{Floor}(\text{SS-PBCH block index}/P) \quad \text{[Equation 2]}$$

In Equations 1 and 2, P may be expressed as 2^(the number of bits transmitted through a PBCH DMRS).

Although a specific value (e.g., 4 or 8) is taken as an example for convenience of description, the present disclosure is not limited to the specific value. For example, the above value may be determined according to the number of information bits transmitted through a PBCH DMRS. Specifically, if 2-bit information is transmitted by the PBCH DMRS, an SS block group may be composed of 4 SS blocks. The SS block time index transmission method used when the subcarrier spacing is 120/240 kHz can also be applied when the subcarrier spacing is 15/30 kHz.

The bit configuration of the time information and the transmission path of the corresponding information described in "1. System Frame Number, Half frame boundary" and "2. SS Block Time Index" will be summarized as follows with reference to FIG. 9 again.

Among 10 bits of the SFN, 7 bits and 3 bits for an SS block group index are transmitted by PBCH contents.

2 bits for 20 ms boundary information (S2 and S1) are transmitted through PBCH scrambling.

1 bit for 5 ms boundary information (C0) and 1 bit for 10 ms boundary information (S0) are transmitted by a DMRS RE position shift, a phase difference between DMRSs in OFDM symbols including PBCHs, a change in DMRS sequence to RE mapping, a change in a PBCH DMRS sequence initial value, etc.

Figure 11:
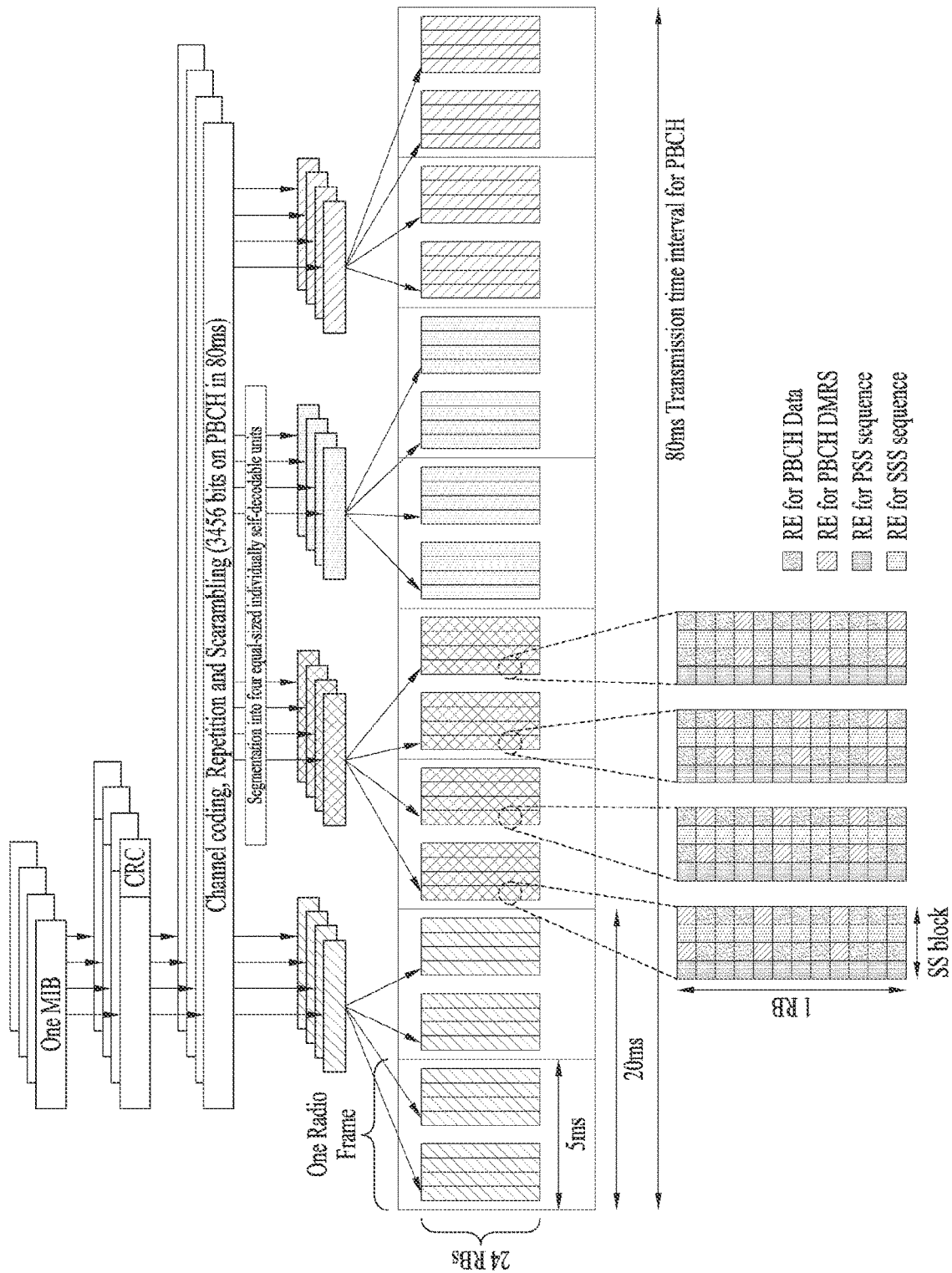

3 bits for SS block index indication information (B2, B1, B0) are transmitted through a DMRS sequence 3. PBCH Coding Chain Configuration and PBCH DMRS Transmission Method Hereinafter, embodiments for PBCH coding chain configurations and PBCH DMRS transmission methods will be described with reference to FIG. 11.

First, an MIB configuration per SS block may vary according to CORESET information and SS block group indices. Thus, MIB encoding is performed per SS block, and in this case, 3456 bits are encoded. Since polar code output bits are 512 bits, the polar code output bits are repeated 6.75 times (512*6+384).

A 3456-length scrambling sequence is multiplied with the repeated bits, and in this case, the scrambling sequence is initialized by a cell ID and an SS block index transmitted through a DMRS. In addition, the 3456-length scrambling sequence are divided into 4 parts, each of which is composed of 864 bits. By applying QPSK modulation to each of them, a set of 4 modulated symbols each having 432-length is configured.

A new modulated symbol set is transmitted every 20 ms. During 20 ms, the same modulated symbol set can be transmitted at most 4 times. In this case, during the period in which the same modulated symbol set is repeatedly transmitted, the location of a DMRS in the frequency domain varies according to a cell ID. That is, the DMRS location is shifted at each of 0/5/10/15 ms according to Equation 3.

$$v\text{shift}=(v\text{shift\_cell}+v\text{shift\_frame})\bmod 4, v\text{shift\_cell}=\text{Cell-ID} \bmod 3, v\text{shift\_frame}=0,1,2,3 \quad \text{[Equation 3]}$$

A length-31 Gold sequence is used as a PBCH DMRS sequence. The initial value of the first m-sequence is fixed to one constant value, and the initial value of the second m-sequence is determined according to an SS block index and a cell ID as shown in Equation 4.

$$c_{init}=2^{10}*(SSBID+1)*(2*CellID+1)+CellID \quad \text{[Equation 4]}$$

If SS blocks have the same contents, the channel coding and beat repetition is performed only for one SS block. In addition, assuming that a different scrambling sequence is applied per SS block, the processes for generating a scrambling sequence, multiplying the generated scrambling sequence, segmenting the multiplied sequence, and modulating the segmented sequence are performed per SS block.

Hereinafter, how a gNB and a UE operate will be described according to methods of transmitting half radio frame information and the most significant 1 bit of an SFN. In the following description, C0 and S0 correspond to the half frame boundary and the frame boundary indication bit of FIG. 9, respectively.

(1) Transmission of C0 and S0 Through CRC

This information varies at each of 0, 5, 10, and 15 ms. In addition, a total of 4 CRCs are created, and encoding is performed 4 times. Each encoded bit is repeatedly arranged and multiplied with a scrambling sequence on the assumption that each encoded bit is transmitted a total of 4 times every 20 ms.

In addition, when a UE performs reception, the UE should additionally perform blind decoding to combine a plurality of pieces of information received at each of 0, 5, 10, and 15 ms. If the blind decoding is performed only for PBCHs received every 20 ms, there is no additional complexity. However, since signals transmitted every 5 ms cannot be combined, it has a disadvantage in that the maximum performance is not guaranteed.

(2) Transmission of C0 and S0 Through PBCH Scrambling

Encoding is performed using one information bit+CRC. The encoded bit is repeatedly arranged and multiplied with a scrambling sequence on the assumption that the encoded bit is transmitted every 5 ms, that is, a total of 16 times. The above method has a problem that the number of blind decoding rounds increase to 16.

(3) Transmission of C0 and S0 Through DMRS Sequence

According to this method, 5-bit information is transmitted using a 144-length sequence. In this case, encoding is performed using one piece of information+CRC. Two scrambling methods may be used.

1) The encoded bit is repeatedly arranged and multiplied with a scrambling sequence on the assumption that the encoded bit is transmitted every 5 ms, that is, a total of 16 times. In this case, since the scrambling sequence varies every 5 ms, ICI randomization may occur in a PBCH. In addition, since a UE obtains information on C0 and S0 from a DMRS sequence, the UE can also obtain information on the scrambling sequence varying at each of 0, 5, 10, and 15 ms. In addition, when PBCH decoding is performed, the number of blind decoding rounds does not increase. Moreover, according to the above method, since signals transmitted every 5 ms are combined with each other, the maximum performance can be expected.

2) The encoded bit is repeatedly arranged and multiplied with a scrambling sequence on the assumption that the encoded bit is transmitted every 20 ms, that is, a total of 4 times. By doing so, ICI randomization can be reduced. In addition, performance improvement can be expected without any increase in the number of blind decoding rounds performed by a UE, and acquisition time can be enhanced.

However, when C0 and S0 are transmitted through the DMRS sequence, the DMRS sequence should include multiple bits. Thus, the following problems may occur: the detection performance is degraded; and the number of blind detection rounds increases. To overcome the problems, the combination should be performed several times.

(4) Transmission of C0 and S0 Through DMRS Position

The basic principles are the same as those when C0 and S0 are transmitted through the DMRS sequence. However, to transmit C0 and S0 through a DMRS position, the position needs to be determined based on a cell ID, and the frequency location moves at each of 0, 5, 10, 15 ms. In this case, a neighbor cell can perform the same shift operation. In particular, if DMRS power boosting is performed, the performance can be further improved.

4. Design of NR-PBCH DM-RS

A DMRS sequence should be able to represent a cell ID, an SS block index in an SS burst set, and a half frame boundary (indication) and can be initialized by the cell ID, SS block index in the SS burst set, and half frame boundary (indication). In this case, the initialization can be performed according to Equation 5 below.

$$c_{init}=(N_{ID}^{SS/PBCH\ block}+1+8\cdot HF)\cdot(2\cdot N_{ID}^{cell}+1)\cdot 2^{10}+N_{ID}^{cell} \quad \text{[Equation 5]}$$

In Equation 5, $N_{ID}^{SS/PBCH\ block}$ indicates the index of an SS block in an SS block group, $N_{ID}^{Cell}$ indicates a cell ID, and HF indicates the index of a half frame indication with the value of {0, 1}.

The DMRS sequence modulated using QPSK, $$r_{N_{ID}^{SS/PBCH\ block}}(m)$$

can be darned as shown in Equation 6 below.

$$r_{N_{ID}^{SS/PBCH\ block}}(m) = \frac{1}{\sqrt{2}}(1-2\cdot c(2m))+j\frac{1}{\sqrt{2}}(1-2\cdot c(2m+1)),$$

$$m = 0, 1, \ldots, 143$$

[Equation 6]

In addition to the QPSK, BPSK can be considered as the modulation format for DMRS sequence generation. The BPSK and QPSK have similar detection performance, but the QPSK is more suitable for the DMRS sequence generation because its correlation performance is higher than that of the BPSK.

Hereinafter, a method of configuring a PBCH DMRS sequence will be described in detail. For a PBCH DMRS sequence, a Gold sequence is used, and two m-sequences consist of polynomials with the same length. If one m-sequence has a shorter length, it may be replaced with a short polynomial.

Embodiment 3-1

Two m-sequences constituting a Gold sequence are configured to have the same length. The initial value of one of the two m-sequences is fixed, and the initial value of the other m-sequence can be initialized by a cell ID and a time indicator.

For example, the length-31 Gold sequence used in the LTE can be applied as the above-described gold sequence. The legacy LTE system has used the length-31 Gold sequence for a CRS and created different sequences by initializing it using 140 time indicators based on 504 cell IDs, 7 OFDM symbols, and 20 slots.

In a frequency band below 6 GHz, since the subcarrier spacing of 15 or 30 kHz is used, a maximum of 8 SS blocks are included during a period of 5 ms. During a period of 20 ms, a maximum of 32 SS blocks may be included. In other words, if information on a boundary of 5 ms is obtained from the PBCH DMRS sequence during the period of 20 ms, an operation for detecting the 32 SS blocks is performed. Since although the number of cell IDs in the NR system is 1008, which are two times greater compared to the LTE system, the number of SS blocks that should be identified decreases to 70 (=140/2), the above-described sequence can be used.

Meanwhile, in a frequency band above 6 GHz, the maximum number of SS block indices transmitted through the PBCH DMRS is 8, which is equal to the maximum number of SS block indices in a frequency band below 6 GHz, even though the maximum number of SS blocks during a period of 5 ms is 64. Thus, it is possible to generate sequences using the length-31 Gold sequence according to a cell ID and a time indicator even in the frequency band above 6 GHz, As another method, Gold sequences with different lengths may be applied according to frequency ranges. In a frequency band above 6 GHz, the subcarrier spacing of 120 and 240 kHz can be used. When the subcarrier spacing is 120 kHz, the number of slots included during 10 ms is 8 times (80 slots) greater than when the subcarrier spacing is 15 kHz. In addition, when the subcarrier spacing is 240 kHz, the number of slots included during 10 ms is 16 times (160 slots) greater than when the subcarrier spacing is 15 kHz. In particular, if the sequence of a data DMRS is initialized using a 16-bit C-RNTI and a slot index, a polynomial longer than 31 may be required. If a length-N (where N>31) Gold sequence is introduced according to the requirement, Gold sequences with different lengths can be applied according to frequency ranges. Specifically, in a frequency band below 6 GHz, the length-31 Gold sequence may be used, and in a frequency band above 6 GHz, the length-N (>31) Gold sequence may be used. In this case, the initial values may be set in a similar manner as described above.

Embodiment 3-2

Two m-sequences constituting a Gold sequence are configured to have the same length. The initial value of one of the two m-sequences is initialized using a time indicator, and the initial value of the other m-sequence can be initialized by a cell ID and another time indicator. For example, the length-31 Gold sequence used in the LTE can be applied as the above-described gold sequence. One m-sequence to which a fixed initial value is applied is initialized using a time indicator, and the other m-sequence is initialized using a cell ID.

As another method, if among time indicators, not only an SS block index but a half radio frame boundary (5 ms), the most significant 1 bit (10 ms boundary) of an SFN, etc. are transmitted through a PBCH DMRS, the half radio frame boundary (5 ms) and the most significant 1 bit (10 ms boundary) of the SFN may be indicated by the first m-sequence, and the SS block index may be indicated by the second m-sequence.

When Gold sequences with different lengths are introduced as described in Embodiment 3-1, the above-described sequence initialization method can be applied.

Embodiment 3-3

A Gold sequence is composed of M-sequences having polynomials with different lengths. The m-sequence with a long polynomial is used for information containing many indications, and the m-sequence with a short polynomial is used for information containing few indications.

The PBCH DMRS sequence is generated based on time information such as a cell ID, an SS block index, etc. Two polynomials with different lengths may be used to represent 1008 cell IDs and P pieces of time information (e.g., a 3-bit SS block indicator). For example, a length-31 polynomial may be used to identify the cell IDs, and a length-7 polynomial may be used to identify the time information. In this case, the two m-sequences may be initialized by a cell ID and time information, respectively. Meanwhile, in the above example, the length-31 polynomial may be a part of the m-sequence in the Gold sequence used in the LTE system, and the length-7 polynomial may be one of two m-sequences defined for configuring an NR-PSS or an NR-SSS.

Embodiment 3-4

A sequence is generated from an m-sequence with a short length, and a sequence is generated from a Gold sequence consisting of M sequences with long polynomials. Thereafter, two sequences are multiplied in an element wise manner.

Hereinafter, a method of configuring an initial value of a sequence which is used as a PBCH DMRS sequence will be described. The PBCH DMRS sequence is initialized by a cell ID and a time indicator. In addition, assuming that a bit string used for the initialization is $c(i)*2^i$, where $i=0, \ldots, 30$, $c(0)$ to $c(9)$ are determined by the cell ID, and $c(10)$ to $c(30)$ are determined by the cell ID and time indicator. In particular, bits corresponding to $c(10)$ to $c(30)$ may carry some of the information in the time indicator, and the initialization method may vary according to the characteristics of the information Embodiment 4-1

When initialization is performed using a cell ID and an SS block index, $c(0)$ to $c(9)$ are determined by the cell ID, and $c(10)$ to $c(30)$ are determined by the cell ID and SS block index. In Equation 7 below, NID denotes the cell ID, and SSBID denotes the SS block index.

$$2^{10}*(SSBID*(2*NID+1))+NID+1$$

$$2^{10}*((SSBID+1)*(2*NID+1))+NID+1$$

$$2^{10}*((SSBID+1)*(2*NID+1))+NID \qquad \text{[Equation 7]}$$

Embodiment 4-2

When a time indicator is added to the initialization method mentioned in Embodiment 4-1, an initialization value is configured such that SS blocks increase. Assuming that the number of SS block indices transmitted through a PBCH DMRS sequence is P, if a half radio frame boundary is configured to be detected from the DMRS sequence, it can be expressed as the effect that the number of SS block indices is doubled can be expected.

In addition, if not only the half frame boundary but also a boundary of 10 ms are configured to be detected, it can be expressed as the effect that the number of SS block indices increases 4 times. Embodiment 4-2 can be summarized as shown in Equation 8 below.

$2^{\wedge}10*((SSBID+P*(i))*(2*NID+1))+NID+1$ $2^{\wedge}10*((SSBID+1+P*(i))*(2*NID+1))+NID+1$ $2^{\wedge}10*((SSBID+1+P*(i))*(2*NID+1))+NID$ [Equation 8]

In Equation 8, when boundaries of 0, 5, 10, and 15 ms are indicated, i=0, 1, 2, or 3. When only the half frame boundary is indicated, i=0 or 1.

Embodiment 4-3

When a time indication is added to the initialization method described in Embodiment 4-1, it can be represented separately from an SS block index. For example, c(0) to c(9) may be determined by a cell ID, c(10) to c(13) may be determined by the SS block index, and c(14) to c(30) may be determined by an additional time indicator such as a half frame boundary, SNF information, etc. Embodiment 4-3 can be summarized as shown in Equation 9 below.

$2^{\wedge}13*(i)+2^{\wedge}10*((SSBID+1))+NID$ $2^{\wedge}13*(i+1)+2^{\wedge}10*((SSBID+1))+NID$ $2^{\wedge}13*(i)+2^{\wedge}10*((SSBID+1))+NID+1$ $2^{\wedge}13*(i+1)+2^{\wedge}10*((SSBID+1))+NID+1$ [Equation 9]

Embodiment 4-4

The maximum number of SS blocks, L is determined depending on frequency ranges. Assuming that the number of SS block indices transmitted through a PBCH DMRS sequence is P, if L is equal to or less than P, all SS block indices are transmitted through the DMRS sequence, and an SS block index is identical to an index obtained from the DMRS sequence. On the contrary, if L is more than P, an SS block index is obtained by combining an index transmitted through the DMRS sequence and an index transmitted through PBCH contents.

Assuming that the index in the DMRS sequence is SSBID and the index in the PBCH contents is SSBGID, the following three cases can be considered.

(1) Case 0: L<=P
SS-PBCH block index=SSBID (2) Case 1: L>P

SS-PBCH block index=SSBID*P+SSBGID

SSBID=Floor(SS-PBCH block index/P)

SSBGID=Mod(SS-PBCH block index,P)

(3) Case 2: L>P

SS-PBCH block index=SSBID*P+SSBGID

SSBID=Mod(SS-PBCH block index,P)

SSBGID=Floor(SS-PBCH block index/P)

Meanwhile, the pseudo-random sequence for generating the NR-PBCH DMRS sequence is defined as the length-31 Gold sequence, and a sequence c(n) with a length of $M_{PN}$ is defined according to Equation 10 below.

$c(n)=(x_1(n+N_C)+x_2(n+N_C))\mod 2$ $x_1(n+31)=(x_1(n+3)+x_1(n))\mod 2$ $x_2(n+31)=(x_2(n+3)+x_2(n+2)+x_2(n+1)+x_2(n))\mod 2$ [Equation 10]

In Equation 10, n=0, 1, . . . , $M_{PN}-1$, $N_c=1600$, the first m-sequence has the following initial values: $x_1(0)=1$, $x_1(n)=0$, n=1, 2, . . . , 30, and the initial values of the second m-sequence is defined as $c_{init}=\Sigma_{i=0}^{30} x_2(i) \cdot 2^i$, where $$x_2(i) = \left\lfloor \frac{c_{init}}{2^i} \right\rfloor \mod 2,$$

i=0, 1, . . . , 30.

5. Design of NR-PBCH DMRS Pattern

Regarding the frequency location of a DMRS, two DMRS RE mapping methods can be considered. According to a fixed RE mapping method, an RS mapping region is fixed in the frequency domain, and according to a variable RE mapping method, an RS location is shifted according to a cell ID based on the V-shift method. The variable RE mapping method has an advantage in that additional performance gain can be achieved through interference randomization, and thus the variable RE mapping method is considered to be more desirable.

The variable RE mapping method is described in detail. First, a complex modulated symbol $\alpha_{k,l}$ included in a half frame can be determined according to Equation 11.

$$a_{k,l} = r_{N_{ID}^{SS/PBCH\,block}}(72 \cdot l' + m') \quad \text{[Equation 11]}$$

$k = 4m' + v_{shift}$ if $l \in \{1, 3\}$ $l = \begin{cases} 1 & l' = 0 \\ 3 & l' = 1 \end{cases}$ $m' = 0, 1, \ldots, 71$ $v_{shift} = N_{ID}^{cell} \mod 3$ In Equation 11, k and l indicates the indices of a subcarrier and an OFDM symbol located in an SS block, and $r_{N_{ID}^{SS/PBCH\,block}}(m)$ indicates a DMRS sequence. Meanwhile, it can be determined by the equation of $v_{shift}=N_{ID}^{cell} \mod 4$.

In addition, RS power boosting may be considered for performance improvement. If the RS boosting is applied together with Vshift, the amount of interference from interference Total Radiated Power (TRP) may be reduced. In addition, considering the detection performance gain of the RS power boosting, it is desirable that a ratio of PDSCH EPRE to RS EPRE is set to −1.25 dB.

Hereinafter, a method for mapping a PBCH DMRS sequence to REs will be described according to embodiments of the present disclosure.

Embodiment 5-1

The length of a DMRS sequence is determined based on the number of REs used for a PBCH DMRS and a modulation order.

When M REs are used for a PBCH DMRS and BPSK modulation is applied to sequences, a length-M sequence is generated. The BPSK modulation is performed in sequence order, and then a modulated symbol is mapped to the DMRS REs. For example, if there are a total of 144 PBCH DMRS REs in two OFDM symbols, a length-144 sequence is generated using one initial value, and then RE mapping is performed after the BPSK modulation.

Meanwhile, when M REs are used for a PBCH DMRS and QPSK modulation is applied, a length-2*M sequence is generated. Assuming that a sequence string is s(0), . . . , s(2*M−1), the QPSK modulation is performed by combining sequences with even indices and sequences with odd indices. For example, if there are a total of 144 PBCH DMRS REs in two OFDM symbols, a length-288 sequence is generated using one initial value, and then a length-144 modulated sequence, which is created after the QPSK modulation, is mapped to the DMRS REs.

In addition, when N REs are used for a PBCH DMRS within one OFDM symbol and BPSK modulation is applied to sequences, a length-N sequence is generated. The BPSK modulation is performed in sequence order, and a modulated symbol is mapped to the DMRS REs. For example, if there are a total of 72 PBCH DMRS REs in one OFDM symbol, a length-72 sequence is generated using one initial value, and then RE mapping is performed after the BPSK modulation. If at least one OFDM symbol is used for PBCH transmission, different sequences may be generated by performing initialization per OFDM symbol. Alternatively, a sequence generated for a previous symbol may be mapped in the same manner.

Moreover, when N REs are used for a PBCH DMRS within one OFDM symbol and QPSK modulation is applied to sequences, a length-2*N sequence is generated. Assuming that a sequence string is s(0), . . . , s(2*N−1), the QPSK modulation is performed by combining sequences with even indices and sequences with odd indices. A modulation symbol is mapped to the DMRS RE. For example, if there are a total of 72 PBCH DMRS REs in one OFDM symbol, a length-144 sequence is generated using one initial value, and the RE mapping is performed after the QPAK modulation. If at least one OFDM symbol is used for PBCH transmission, different sequences may be generated by performing initialization per OFDM symbol. Alternatively, a sequence generated for a previous symbol may be mapped in the same manner.

Embodiment 5-2

When one same sequence is mapped to different symbols, a cyclic shift(s) can be applied. For example, when two OFDM symbols are used, if a modulated sequence string is sequentially mapped to REs of the first OFDM symbol, the modulated sequence string may be mapped to REs of the second OFDM symbol after the modulated sequence string is cyclic shifted by an offset corresponding to ½ of the modulated sequence string N. When 24 RBs are used for an NR-PBCH and 12 RBs are used for an NR-SSS, if the center frequency RE of the NR-SSS is equivalent to that of the NR-PBCH, the NR-SSS is located from the seventh RB to the eighteenth RB. A channel can be estimated from the NR-SSS, and when an SS block index is detected from an NR-PBCH DMRS, coherent detection may be attempted using the estimated channel. If the above cyclic shift method is applied to facilitate the detection, it is possible to obtain the effect that a PBCH DMRS sequence string is transmitted across two OFDM symbols in the center 12-RB region where the NR-SSS is transmitted.

Embodiment 5-3

If a different time indicator is transmitted rather than an SS block indication, a cyclic shift value can be determined according to the time indicator.

If one same sequence is applied to OFDM symbols, one same cyclic shift may be applied to each of the OFDM symbol, or different cyclic shifts may be applied to the OFDM symbols. If a generated sequence is equivalent to the total number of DMRS REs included an OFDM symbol used for a PBCH, the entire sequence may be mapped to the DMRS REs after applying a cyclic shift thereto. As another example of the cyclic shift, reverse mapping may be considered. For instance, assuming that a modulated sequence string is s(0), . . . , s(M−1), reverse mapping may correspond to s(M−1), . . . , s(0).

Hereinafter, a frequency location of a PBCH DMRS RE will be described.

The frequency locations of REs used for a PBCH DMRS may vary depending on a specific parameter.

Embodiment 6-1

When a DMRS is located at every N NEs (for example, N=4), the maximum range where the RE location can be shifted in the frequency domain may be set to N. For example, it can be expressed as N*m+v_shift (where m=0, . . . , 12×NRB_PBCH−1 and v_shift=0, . . . , N−1).

Embodiment 6-2

A shift offset on the frequency axis can be at least determined by a cell ID. Specifically, the shift offset may be determined using the cell ID, which is obtained from a PSS and an SSS. In the NR system, the cell ID can be configured by combining Cell_ID(1) obtained from the PSS and Cell_ID(2) obtained from the SSS and expressed as Cell_ID(2)*3+Cell_ID(1). In addition, the shift offset may be determined using the obtained cell ID information or some thereof. Equation 12 below shows an example of calculating the offset.

$$v\_shift=\text{Cell-ID mod } N \text{ (where } N \text{ indicates DMRS frequency spacing, and for example, } N \text{ may be set to 4)}$$

$$v\_shift=\text{Cell-ID mod 3 (the effect of interference randomization between three neighbor cells can be expected, DMRS frequency spacing may be greater than 3, and for example, } N \text{ may be set to 4)}$$

$$v\_shift=\text{Cell\_ID(1)(Cell\_ID(1) obtained from the PSS is used as the shift offset value)} \quad [\text{Equation 12}]$$

Embodiment 6-3

A shift offset on the frequency axis can be determined by a certain value in time information. For example, the shift offset value may be determined by half radio frame boundary (5 ms) or the most significant 1-bit information of an SF (10 ms boundary), etc. Equation 13 below shows an example of calculating the offset.

v_shift=0,1,2,3 (the DMRS location is shifted at each of 0/5/10/15 ms, and there are four shift opportunities when DMRS frequency spacing is 4)

v_shift=0,1 (the DMRS location is shifted at the boundary of 0/5 ms or at the boundary of 0/10 ms)

v_shift=0,2 (the DMRS location is shifted at the boundary of 0/5 ms or at the boundary of 0/10 ms, and when DMRS frequency spacing is 4, the DMRS location is shifted by the maximum value,2) [Equation 13]

Embodiment 6-4

A shift offset on the frequency axis can be determined by a cell ID and a certain value in time information. For example, the shift offset can be configured by combining Embodiment 6-2 and Embodiment 6-3. Specifically, the shift offset can be configured by combining vshift_cell, which is a shift according to the cell ID, and vshift_frame, which is a shift according to the time information, and the gap may be represented by modulor operation with DMRS RE spacing, N. Equation 14 below shows an example of calculating the above offset.

$$v\text{shift}=(v\text{shift\_cell}+v\text{shift\_frame}) \bmod N \quad \text{[Equation 14]}$$

Figure 12:
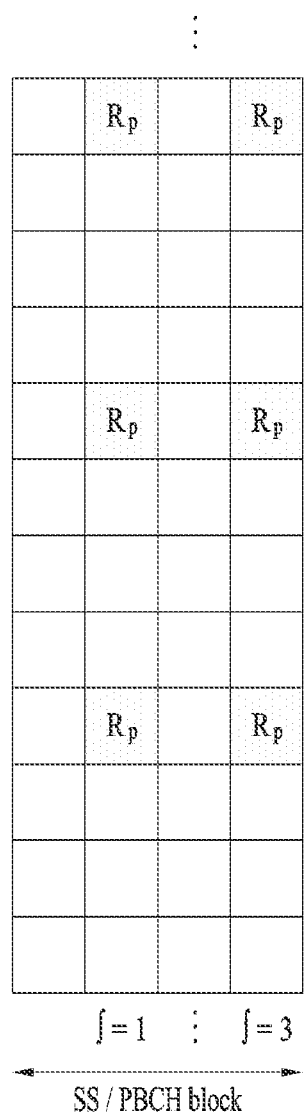

FIG. 12 is a view illustrating an example in which a DMRS is mapped within an SS block.

Hereinafter, a power ratio between a PBCH DMRS RE and a data RE will be described. Specifically, an RE for PBCH DMRS transmission can be transmitted with higher power than an RE for data transmission in an OFDM symbol in which a PBCH DMRS is included.

Embodiment 7-1

The ratio of energy per data RE to energy per DMRS RE is fixed per frequency band. In this case, all frequency bands may use fixed values, or a specific power ratio may be applied to a specific frequency band. In other words, a different power ratio may be applied per frequency band. For example, in a frequency band below 6 GHz where ICI is dominant, high power may be used, and in a frequency band above 6 GHz where noise is limited, the same power may be used.

Although in this present disclosure, the power ratio is expressed as the 'ratio to the energy per data RE to energy per DMRS RE' for convenience of description, but the present disclosure is not limited thereto, that is, the power ratio can be expressed in various ways. For example, the following expressions can be used.

A ratio of power per DMRS RE to power per data RE
A ratio of energy per DMRS RE to energy per data RE
A ratio of power per data RE to power per DMRS RE
A ratio of energy per data RE to energy per DMRS RE

Embodiment 7-2

The power of a DMRS RE may be set lower than the power of a data RE by 3 dB. For example, it is assumed that the following two cases show similar PBCH decoding performance: when among 12 REs, 3 REs are used for a DMRS and 9 REs are used for data; and when among 12 REs, 4 REs are used for a DMRS and 8 REs are used for data. When the 3 DMRS REs are used, it is possible to increase the DMRS power while maintaining the total power of an OFDM symbol by increasing the power of the 3 DMRS REs about 1.3334 times per RE and decreasing the power of adjacent data REs about 0.8999 times in order to obtain a similar effect when the 4 DMRS REs are used. In this case, a power boosting level becomes about 1.76 dB (=10*log (1.3334/0.8889)).

As another example, when 3 DMRS REs and 9 data REs are used, a power boosting level is about 3 dB to provide similar detection performance when 4.8 DMRS REs are used (the power boosting level is about 2 dB to provide similar detection performance when 4.15 DMRS REs are used).

Embodiment 7-3

When the NR system operate in non-standalone (NSA) mode through association with the LTE system, a gNB can inform a UE of a ratio of energy per data RE to energy per DMRS RE.

Embodiment 7-4

A gNB can inform a UE of a ratio of energy per PBCH data RE to energy per DMRS RE used in the NR system. For example, during an initial access procedure, the UE may demodulate PBCH data on the assumption that the ratio of the energy per PBCH data RE to the energy per DMRS RE is constant. Thereafter, the gNB may inform the UE of energy ratios used for actual transmission. In particular, the gNB may indicate an energy ratio for a target cell among configurations for handover.

As another example, energy ratios may be indicated with system information indicating transmission power of a PBCH DMRS for a serving cell. In this case, at least one energy ratio value is 0 dB, and if the transmission power of the DMRS varies, a corresponding value may also be included.

6. Measurement Result Evaluation

Hereinafter, it is assumed that while measurement results of various SS block are evaluated, two OFDM symbols having 24 RBs are used for NR-PBCH transmission. In addition, it is assumed that an SS burst set (i.e., 10, 20, 40, and 80 ms) may have a plurality of periodicities and an encoded bit is transmitted within 80 ms.

(1) Modulation Type

Figure 13:
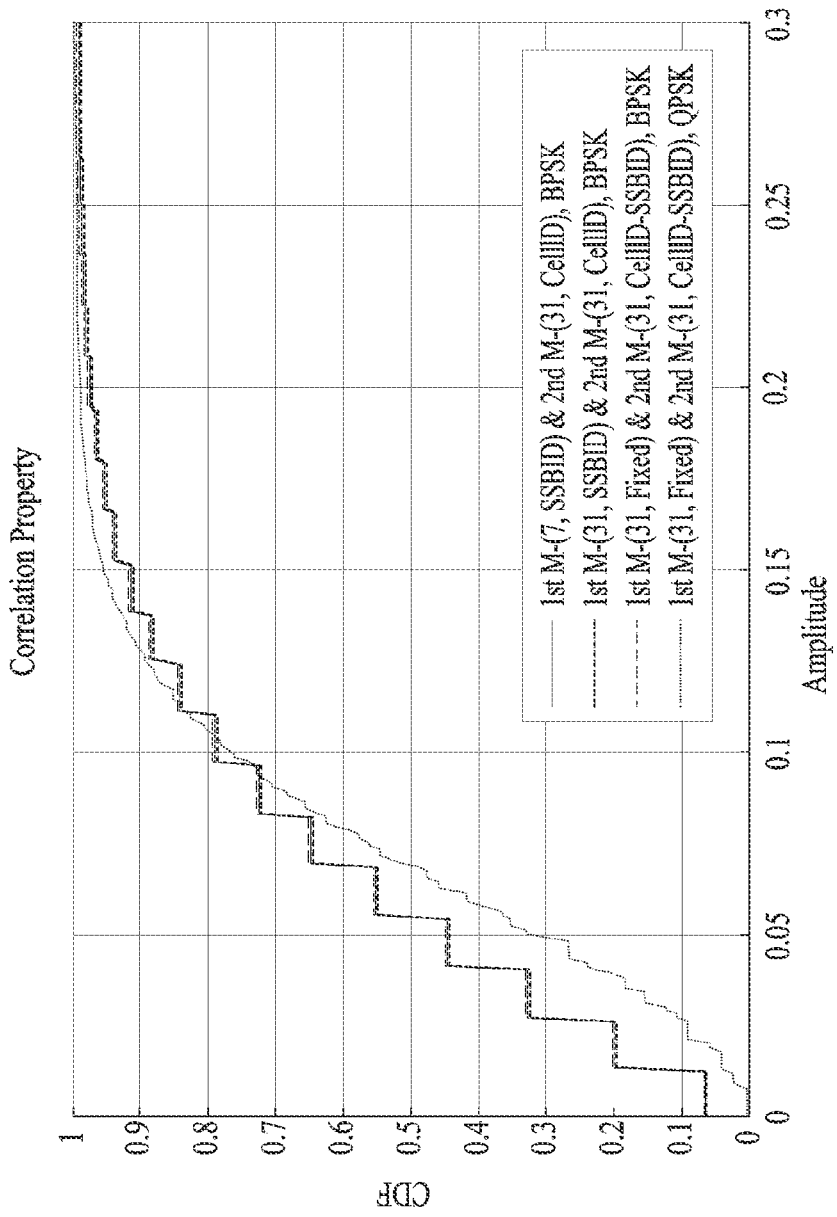
FIGS. 13 to 15 illustrate performance measurement results according to an embodiment of the present disclosure.

Referring to FIG. 13, it can be seen that BPSK and QPSK has similar performance. Thus, there is no significant difference in term of performance measurement even though any modulation type is used for a DMRS sequence.

(2) DMRS RE Mapping

It is assumed that transmission power of a DMRS RE is higher than transmission power of a PBCH data RE by about 1.76 dB (=10*log (1.334/0.889)). If variable RE mapping and DMRS power boosting is used together, interference from another cell can be reduced. Meanwhile, when RS power boosting is applied, a gain of about 2 to 3 dB can be obtained compared to when no RS power boosting is applied.

Figure 14:
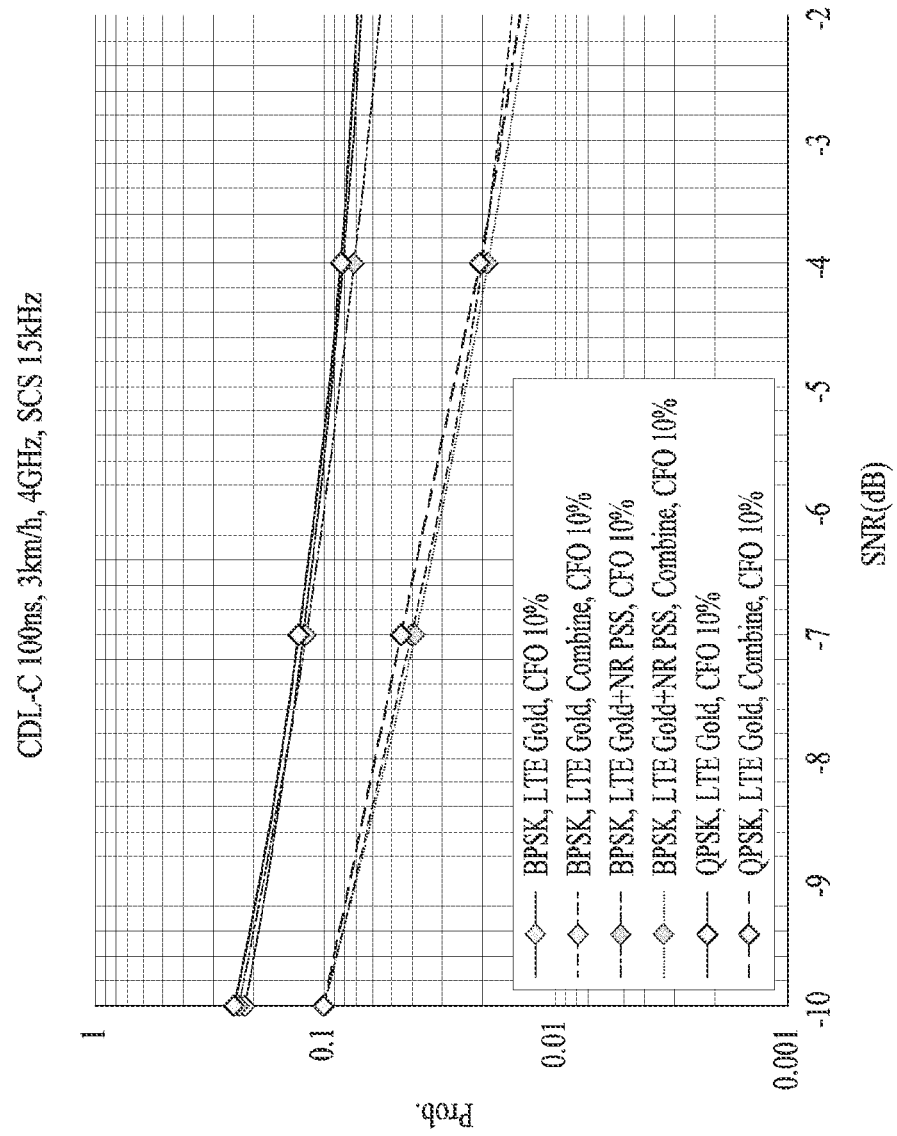
Figure 15:
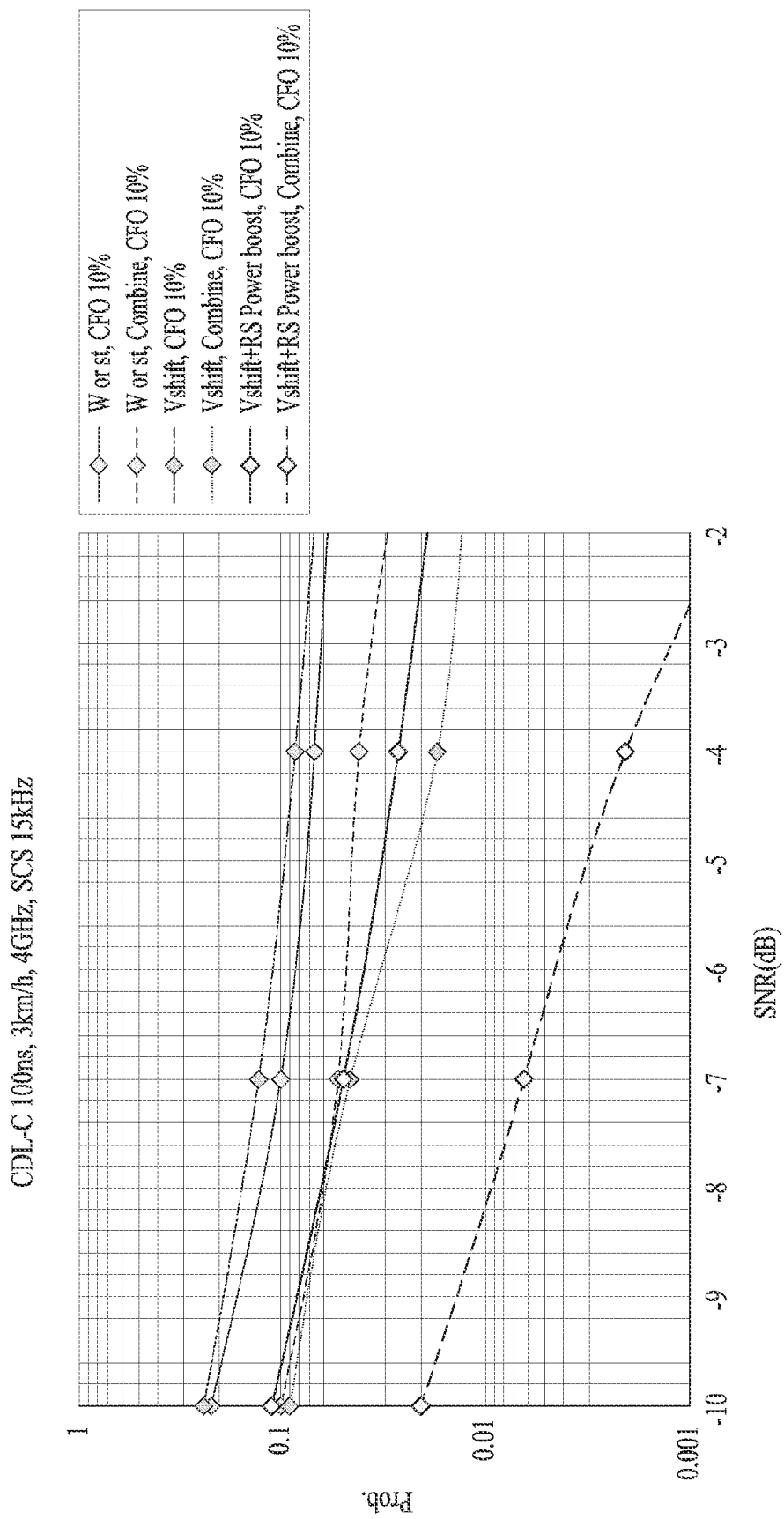

Meanwhile, the results of an experiment where Vshift is applied to the RS power boosting will be described with reference to FIGS. 14 and 15. By introducing Vshift for changing the frequency-domain location of a DMRS RE according to a cell ID, the following effect can be obtained. That is, PBCH DMRSs transmitted in a multi-cell environment are received during two periods, and if two PBCHs are combined, detection performance can be improved by ICI randomization. Particularly, when Vshift is applied, the detection performance can be significantly improved.

7. Half Frame Index Indication and Signal Design

Meanwhile, in addition to the above-described time index indication method, other time index indication methods can be considered. In particular, various embodiments for indicating a half frame index will be explained in the following.

SS blocks included in 5 ms duration may be transmitted with a periodicity of 5, 10, 20, 40, 80, or 160 ms. In addition, during an initial access procedure, a UE performs signal detection on the assumption that SS blocks are transmitted with a periodicity longer than 5 ms (e.g., 10 ms, 20 ms, etc.). Particularly, in the NR system, a UE performs signal detection during the initial access procedure on the assumption that SS blocks are transmitted with a periodicity of 20 ms.

If a gNB is configured to transmit an SS block with a periodicity of 5 ms and a UE is configured to detect the SS block with a periodicity of 20 ms, the UE should consider that the SS block can be transmitted in a first half radio frame and it can also be transmitted in a second half radio frame. In other words, the UE cannot exactly know whether the SS block will be received in the first half radio frame or the second half radio frame. Thus, the following methods can be considered in order for the gNB to inform whether the SS block is transmitted in the first half radio frame or the second half radio frame.

(1) Explicit Indication:
PBCH contents vary with a periodicity of 5 ms. In this case, the UE can obtain half frame time information by decoding the received SS block.

(2) Implicit Indication:
A PBCH DMRS sequence varies with a periodicity of 5 ms.
A PBCH DMRS sequence mapping method varies with a periodicity of 5 ms.
Phases of OFDM symbols reserved for PBCH transmission vary with a periodicity of 5 ms.
A different scrambling sequence is applied to encoded bits in PBCH contents with a periodicity of 5 ms.

The above-described methods can not only be combined with each other but also be modified. In addition, for transmission of half frame time information, various methods may be considered according to UE states, for example, whether a UE is in an initial access state or IDLE mode or depending on how a UE should receive time information, for example, whether the UE performs inter-cell handover or inter-RAT handover.

Hereinafter, methods for reducing complexity when half frame time information is obtained will be described.

Embodiment 8-1

During an initial access procedure, a UE attempts to detect a signal in an SS block by assuming that the SS block is transmitted at one fixed position of either a first or second half frame. That is, the UE obtains time information such as an SFN, an SS block index, etc. by performing sequence detection or data decoding on the signal or channel included in the SS block and obtains half frame information from the locations of a slot and OFDM symbols in a radio frame, which are defined for SS block transmission.

As a particular example of the above method and more particularly the time information acquisition method, a method of allowing a UE performing initial access to detect an SS block transmitted in a specific half frame and precluding the UE from detecting any SS blocks transmitted in another half fame when the SS block transmission is performed at a periodicity of 5 ms will be explained together with UE operations.

To this end, two different types of SS blocks can be configured. In the present disclosure, the two different types of SS blocks are referred to as a first type of SS block and a second type of SS block for convenience of description. A network configures the first type of SS block and then configures the second type of SS blocks by changing the phase, symbol location, sequence type, symbol mapping rule, and transmission power of a PSS/SSS/PBCH included in the first type of SS block.

Thereafter, a gNB transmits the first type of SS blocks in a first half frame and then transmits the second type of SS blocks in a second half frame.

While performing initial access, a UE attempts synchronization signal detection and PBCH decoding by assuming that the first type of SS blocks are transmitted from the gNB. If the UE succeeds in the synchronization signal detection and PBCH decoding, the UE assumes the corresponding point as a slot and an OFDM symbol included in the first half frame.

Embodiment 8-2

As a particular method of Embodiment 8-1, a method of obtaining half frame boundary information by changing phases of some symbols among symbols to which a PSS/SSS/PBCH in an SS block is mapped will be described.

That is, it is possible to transmit time information such as an SFN, a half frame, an SS block index, etc., by changing the phase of a PSS/SSS/PBCH in an SS block. In particular, it can be used to transmit time information on the half frame.

In this case, it is assumed that the PSS/SSS/PBCH included in the SS block use one same antenna port.

Specifically, the phase of an OFDM symbol including a PSS/SSS and the phase of an OFDM symbol including a PBCH may be inverted every transmission period. In this case, one transmission period in which the phase inversion occurs may be 5 ms.

Figure 16:
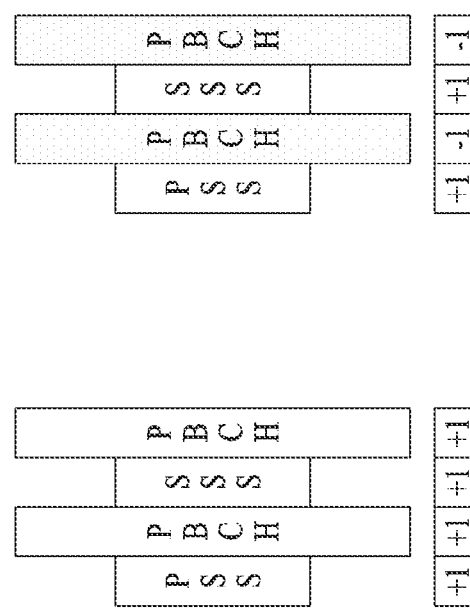
FIG. 16 is a view illustrating a method of obtaining half frame boundary information according to an embodiment of the present disclosure.
Figure 16:
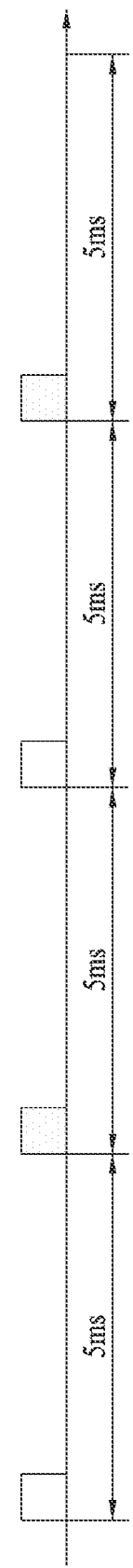

Referring to FIG. 16, a phase of (+1, +1, +1, +1) or (+1, −1, +1, −1) may be applied to an OFDM symbol including a PSS-PBCH-SSS-PBCH with a periodicity of 5 ms. As another method, the polarity of an OFDM symbol including a PSS/SSS can be inverted. That is, assuming that the polarity of an OFDM symbol including a PSS-PBCH-SSS-PBCH is (a, b, c, d), the polarity of a PBCH may be inverted to (+1, +1, +1, +1) and (−1, +1, −1, +1). In addition, the polarity of a certain OFDM symbol among OFDM symbols including PSSs or SSSs may be inverted to (+1, +1, +1, +1) and (+1, +1, −1, +1) or (+1, +1, +1, +1) and (−1, +1, +1, +1).

Meanwhile, a method of changing a phase with a periodicity of 20 ms can be also considered. That is, referring to FIG. 16, phases of (+1, +1, +1, +1), (+1, −1, +1, −1), (+1, −1, −1, −1), and (−1, −1, −1, −1) may be transmitted during the first, second, third, and fourth 5 ms periods, respectively. According to the above-described method, half frame boundary information, i.e., a 5 ms period can be obtained, and since the phase inversion occurs every 20 ms, SFN information can be obtained. Specifically, for the purpose of obtaining the SFN information, the phase of (+1, +1, +1, +1) may be transmitted during the first 10 ms period and the phase of (+1, −1, +1, −1) may be transmitted during the second 10 ms period within a period of 20 ms.

Meanwhile, only the phases of a PSS and an SSS included in an SS block may be inverted to distinguish between 20 ms periods. For example, the phase of (+1, +1, +1, +1) may be transmitted during the first 5 ms period, and the phase of (−1, +1, −1, +1) may be transmitted during the second to fourth 5 ms periods. In other words, it is possible to distinguish between the 20 ms periods by changing and transmitting the phase of a PSS/SSS during the first 5 ms period and the phases of PSSs/SSSs during the remaining 5 ms periods.

In this case, since the phases of the PSSs/SSSs of the SS blocks, which are transmitted during the second to fourth 5 ms periods, are inverted, a UE may fail to detect the SS blocks.

Meanwhile, in addition to the polarity inversion of a transmitted phase, a phase change thereof can also be considered. For example, SS blocks may be transmitted using phases of (+1, +1, +1, +1) and (+1, +j, +1, +j) with a periodicity of 5 ms. Alternatively, SS blocks may be transmitted using phases of (+1, +1, +1, +1) and (+1, −j, +1, −j) with a periodicity of 5 ms.

Half frame time information can be obtained from a phase change in a PBCH symbol and can be used to determine a PBCH scrambling sequence. That is, a gNB may configure an SS block by changing the phases of SSS and PBCH symbols every 5 ms and perform transmission. In other words, the gNB may change the phases of the symbols in which the PBCH and SSS in the SS block are transmitted based on the transmission location of the SS block within a specific period. In this case, the symbols of which the phases are changed may be limited to SSS and PBCH symbols corresponding to SS blocks that are actually transmitted by the gNB rather than SSS and PBCH symbols corresponding to all candidate SS blocks where SS block transmission is possible.

In other words, if the SS block transmission is not actually performed in a candidate SS block even though it is included in a 5 ms half frame, the phases of SSS and PBCH symbols of the candidate SS block may not be changed.

To this end, the following methods are proposed.

(Method 1) 1 bit of a PBCH DMRS can be used as an indicator indicating a half frame. In addition, a PBCH scrambling sequence may be initialized by an indicator for half frame timing. In this case, MSB [7 to 10] bits of an SFN may be explicitly indicated through PBCH contents, and LSB [3] bits of the SFN may be used for the PBCH scrambling sequence.

(Method 2) 1 bit for half frame timing may be indicated by a PBCH. In addition, a PBCH scrambling sequence may be initialized by the indicator for the half frame timing. In this case, there may be a phase difference between PBCH and SSS symbols. MSB [7 to 10] bits of an SFN may be explicitly indicated through PBCH contents, and LSB [3] bits of the SFN may be used for the PBCH scrambling sequence.

(Method 3) 1 bit for half frame timing may be indicated by a PBCH. In this case, there may be a phase difference between PBCH and SSS symbols. MSB [7 to 10] bits of an SFN may be explicitly indicated through PBCH contents, and LSB [3] bits of the SFN may be used for a PBCH scrambling sequence.

Embodiment 8-3

A gNB transmits the transmission periodicity of actually transmitted SS blocks to a UE performing measurement and handover. Additionally, the transmission periodicity may be transmitted together with measurement periodicity information included in measurement-related time information. In addition, the UE may perform the measurement and handover by considering the measurement periodicity information as the transmission periodicity information. Moreover, a handover command may include cell information and system information related to a target cell such as SIB 0, SIB 1, SIB 2, etc. Meanwhile, in the NR system, new system information including the information defined in the LTE system such as SIB 0, SIB 1, SIB 2, etc. is referred to as Remaining Minimum System Information (RMSI) for convenient discussion about the system design.

The above-described RMSI may include information on the locations of the actually transmitted SS blocks and the transmission periodicity thereof. In addition, for the handover, information on SS block transmission periodicities of handover candidate cells as well as the target cell should be transmitted to the UE. Thus, the information on the SS block transmission periodicities of the candidate cells can be defined as system information different from the handover command and then transmitted to the UE.

In this case, the UE operates as follows. When an SS block transmission periodicity longer than 5 ms is indicated, the UE detects synchronization signals of neighbor cells and obtains time information, i.e., SS block indices using a first type of SS block. If a transmission periodicity of 5 ms is indicated, the UE detects synchronization signals of neighbor cells and obtains time information using first and second types of SS blocks.

Meanwhile, as a method of reducing UE's reception complexity, it may be considered that a UE searches for SS blocks with a periodicity of 10 ms using a first type of SS block and then attempts synchronization signal detection and time information acquisition using a second type of SS block at the time location away from the first type of SS block detected during a period of 10 ms by an offset of about 0.5 ms after detecting the first type of SS block. In addition, according the above-described method, a UE performing handover may obtain time information used in a target cell/candidate cells/target RAT.

Embodiment 8-3 can be summarized as follows. When the measurement periodicity is transmitted to a UE, the transmission periodicity of actually transmitted SS blocks is also transmitted to the UE. In this case, the measurement configuration may be considered as the measurement periodicity from the perspective of the UE, and it may be configured to be longer than the transmission periodicity of the SS blocks actually transmitted by the gNB. In addition, when the UE intends to decode PBCHs of neighbor cells before handover, the UE may perform the decoding with reference to the transmission periodicity of the actually transmitted SS blocks. Moreover, since the number of decoding rounds decreases, UE's batter consumption may also be reduced.

Embodiment 8-4

A channel/signal configuration, a resource configuration method, a sequence mapping method, etc. may vary according to gNB's time information assumptions or UE's states.

Time information may include an SFN, a slot number, an OFDM symbol number, etc. During a time period of M, the subframe number and slot number are indexed, and during a time period of N less than M, the subframe number and slot number may be indexed. In this case, M and N may be 10 ms and 5 ms, respectively. In addition, time indices defined in different time ranges may be applied according to the following conditions: gNB's time information assumptions, UE's access states, etc.

To this end, the following methods are proposed.

(Method 1) The time information, channel/signal configuration, and resource configuration method may vary depending on a synchronization indicator indicating whether the network is either a synchronous network or an asynchronous network or according to UE's access states such as initial access, handover, IDLE/CONNECTED mode, etc. In this case, the synchronization indicator may be transmitted from a gNB to a UE.

(Method 2) The sequence mapped to a reference signal such as a DMRS, a CSI-RS, an SRS, etc. or the scrambling sequence of a data bit such as PDSCH/PUSCH may vary according to the time information within a period of 10 ms such as a slot number or an OFDM symbol number or with a periodicity of 5 ms. That is, CSI-RS resources, PRACH resources, and the like may be configured based on radio frame duration, first half frame duration, or second half frame duration within a period of 10 ms. Alternatively, they may be configured based on half frames with a periodicity of 5 ms.

(Method 3) The channel/signal configuration, resource configuration method, and sequence mapping method may vary according to bandwidth parts. In a bandwidth part used for the initial access, broadcasting SI, a data channel for carrying RACH Msg 2/3/4 and paging such as PDSCH/PUSCH, and a reference signal such as DMRS/CRS-RS/SRS/PTRS may be configured within the time period of N and repeatedly transmitted every N time period. Meanwhile, in a bandwidth part configured in the RRC_CONNECTED state, the data channel, control channel, and reference signal may be configured within the time period of M and repeatedly transmitted every M time period.

(Method 4) The resources used for handover such as a PRACH preamble, Msg 2, etc. may be configured within the time period of M or N. For convenience of description, it is assumed that M=10 ms and N=5 ms.

When the synchronous network is indicated to the UE, the UE may assume that signals transmitted from cells in the same frequency band are received within a predetermined error range (for example, 1 ms). Thereafter, the UE may assume that 5 ms time information obtained from a serving cell can be equally applied not only to the serving cell but also neighbor cells.

Under this assumption, the resource configured within the time period of M can be utilized. In other words, even though the UE does not receive any special indicators from the gNB, the UE may use the resources configured within the time period of M in an environment where the UE can assume the synchronous network. On the contrary, when the asynchronous network is indicated to the UE or in an environment where the UE can assume the asynchronous network, the UE may use the resources configured within the time period of N.

(Method 5) When the synchronous network is indicated to the UE, the UE may assume that signals transmitted from cells in the same frequency band are received within a predetermined error range (for example, 1 ms). Thereafter, the UE may assume that 5 ms time information obtained from a serving cell can be equally applied not only to the serving cell but also neighbor cells.

Figure 17:
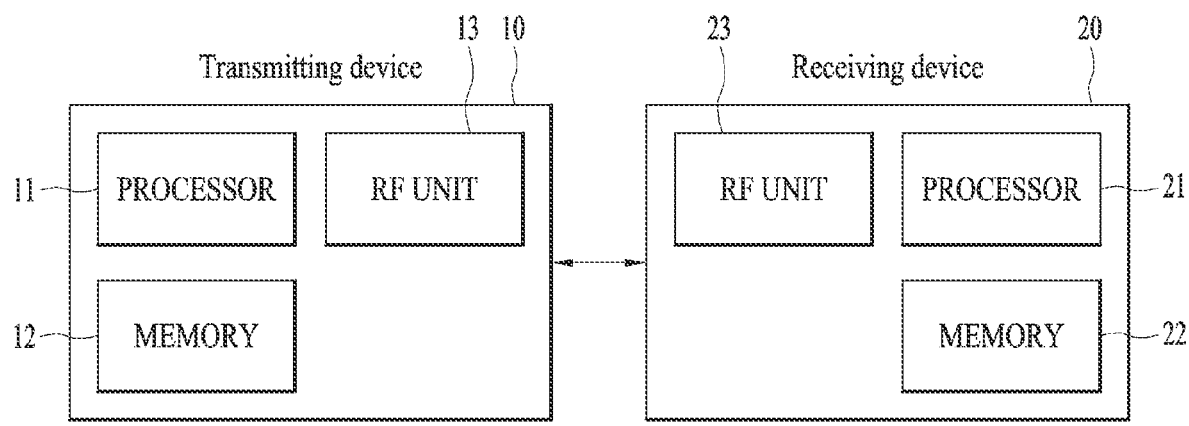
FIG. 17 is a block diagram illustrating components of communication devices according to an embodiment of the present disclosure.

FIG. 17 is a block diagram illustrating components of a transmitting device 10 and a receiving device 20 which implement the present disclosure.

The transmitting device 10 and the receiving device 20, respectively include radio frequency (RF) units 13 and 23 which transmit or receive radio signals carrying information/and or data, signals, and messages, memories 12 and 22 which store various types of information related to communication in a wireless communication system, and processors 11 and 21 which are operatively coupled with components such as the RF units 13 and 23 and the memories 12 and 22, and control the memories 12 and 22 and/or the RF units 13 and 23 to perform at least one of the foregoing embodiments of the present disclosure.

The memories 12 and 22 may store programs for processing and control of the processors 11 and 21, and temporarily store input/output information. The memories 12 and 22 may be used as buffers.

The processors 11 and 21 generally provide overall control to the operations of various modules in the transmitting device or the receiving device. Particularly, the processors 11 and 21 may execute various control functions to implement the present disclosure. The processors 11 and 21 may be called controllers, microcontrollers, microprocessors, microcomputers, and so on. The processors 11 and 21 may be achieved by various means, for example, hardware, firmware, software, or a combination thereof. In a hardware configuration, the processors 11 and 21 may be provided with application specific integrated circuits (ASICs), digital signal processors (DSPs), digital signal processing devices (DSPDs), programmable logic devices (PLDs), field programmable gate arrays (FPGAs), etc. In a firmware or software configuration, firmware or software may be configured to include a module, a procedure, a function, or the like. The firmware or software configured to implement the present disclosure may be provided in the processors 11 and 21 or may be stored in the memories 12 and 22 and executed by the processors 11 and 21.

The processor 11 of the transmitting device 10 performs a predetermined coding and modulation on a signal and/or data which is scheduled by the processor 11 or a scheduler connected to the processor 11 and will be transmitted to the outside, and then transmits the encoded and modulated signal and/or data to the RF unit 13. For example, the processor 11 converts a transmission data stream to K layers after demultiplexing, channel encoding, scrambling, modulation, and so on. The encoded data stream is referred to as a codeword, equivalent to a data block provided by the MAC layer, that is, a transport block (TB). One TB is encoded to one codeword, and each codeword is transmitted in the form of one or more layers to the receiving device. For frequency upconversion, the RF unit 13 may include an oscillator. The RF unit 13 may include $N_t$ transmission antennas ($N_t$ is a positive integer equal to or greater than 1).

The signal process of the receiving device 20 is configured to be reverse to the signal process of the transmitting device 10. The RF unit 23 of the receiving device 20 receives a radio signal from the transmitting device 10 under the control of the processor 21. The RF unit 23 may include $N_r$ reception antennas, and recovers a signal received through each of the reception antennas to a baseband signal by frequency downconversion. For the frequency downconversion, the RF unit 23 may include an oscillator. The processor 21 may recover the original data that the transmitting device 10 intends to transmit by decoding and demodulating radio signals received through the reception antennas.

Each of the RF units 13 and 23 may include one or more antennas. The antennas transmit signals processed by the RF units 13 and 23 to the outside or receive radio signals from the outside and provide the received radio signals to the RF units 13 and 23 under the control of the processors 11 and 21 according to an embodiment of the present disclosure. An antenna may also be called an antenna port. Each antenna may correspond to one physical antenna or may be configured to be a combination of two or more physical antenna elements. A signal transmitted from each antenna may not be further decomposed by the receiving device 20. An RS transmitted in correspondence with a corresponding antenna defines an antenna viewed from the side of the receiving device 20 and enables the receiving device 20 to perform channel estimation for the antenna, irrespective of whether a channel is a single radio channel from one physical antenna or a composite channel from a plurality of physical antenna elements including the antenna. That is, the antenna is defined such that a channel carrying a symbol on the antenna may be derived from the channel carrying another symbol on the same antenna. In the case of an RF unit supporting MIMO in which data is transmitted and received through a plurality of antennas, the RF unit may be connected to two or more antennas.

In the present disclosure, the RF units 13 and 23 may support reception BF and transmission BF. For example, the RF units 13 and 23 may be configured to perform the exemplary functions described before with reference to FIGS. 5 to 8 in the present disclosure. In addition, the RF units 13 and 23 may be referred to as transceivers.

In embodiments of the disclosure, a UE operates as the transmitting device 10 on UL, and as the receiving device 20 on DL. In the embodiments of the disclosure, the gNB operates as the receiving device 20 on UL, and as the transmitting device 10 on DL. Hereinafter, a processor, an RF unit, and a memory in a UE are referred to as a UE processor, a UE RF unit, and a UE memory, respectively, and a processor, an RF unit, and a memory in a gNB are referred to as a gNB processor, a gNB RF unit, and a gNB memory, respectively.

The gNB processor according to the present disclosure is configured to generate a PBCH payload including bits indicating a frame and a half frame where a PBCH is transmitted, generate scrambling sequences using second and third least significant bits among the bits indicating the frame, and scramble the bits included in the PBCH payload based on the scrambling sequences. In this case, a first scrambling sequence is generated using a cell identifier and the second and third least significant bits among the bits indicating the frame, and the bits included in the PBCH payload are scrambled based on the first scrambling sequence. In this case, the second and third least significant bits are not scrambled. Therefore, the first scrambling sequence may be equally applied during a period of 20 ms.

Thereafter, the scrambled bits of the PBCH payload and the second and third least significant bits are encoded, and then the encoded bits are scrambled again using a second scrambling sequence. In this case, the second scrambling sequence is generated using the cell identifier and an index of an SSB, which is used for generating a sequence of a PBCH DMRS. In particular, in a frequency band below 3 GHz, the second scrambling sequence is generated using least significant 2 bits of the SSB index, and in a frequency band above 3 GHz, the second scrambling sequence is generated using least significant 3 bits of the SSB index.

Thereafter, the gNB processor is configured to transmit the scrambled bits, which are scrambled using the second scrambling sequence, to a UE.

The UE processor according to the present disclosure is configured to receive a PBCH in a specific half frame through an SSB, obtain least significant 2 or 3 bits for an index of the SSB from a PBCH DMRS, descramble a scrambled sequence, which is received on the PBCH, using a cell identifier and the least significant 2 or 3 bits obtained from the PBCH DMRS, and obtain a scrambled sequence using second and third least significant bits of a frame number indicator and a first scrambling sequence. In addition, the UE processor is configured to obtain information on the specific half frame and information on a frame including the specific half frame by descrambling the scrambled sequence using the cell identifier, the second and third least significant bits, and the first scrambling sequence.

The gNB processor or the UE processor of the present disclosure may be configured to implement the present disclosure in a cell operating in a high frequency band at or above 6 GHz in which analog BF or hybrid BF is used.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The methods of transmitting and receiving a broadcasting channel and devices therefor are described based on the 5G New RAT system, but the methods and devices can be applied to various wireless communication systems as well as the 5G New RAT system.

What is claimed is:

1. A method of receiving a physical broadcast channel (PBCH) by a user equipment (UE) in a wireless communication system, the method comprising:
    receiving i) a synchronization signal/PBCH block (SS/PBCH block) including the PBCH and ii) a demodulation reference signal (DMRS) for the PBCH; and
    obtaining a bit sequence of a PBCH payload, based on the PBCH,
    wherein a second bit sequence is obtained based on a first bit sequence and a second scrambling sequence, wherein the second scrambling sequence and the DMRS are based on same bits of an index of the SS/PBCH block,
    wherein the first bit sequence is obtained based on the bit sequence of the PBCH payload and a first scrambling sequence, and
    wherein the first scrambling sequence is based on $2^{nd}$ and $3^{rd}$ least significant bits of a system frame number (SFN) for a frame in which the PBCH is present.

2. The method of claim 1,
    wherein the first and second scrambling sequences are further based on an identifier of a cell on which the SS/PBCH block is received.

3. The method of claim 1,
    wherein the bit sequence of the PBCH payload includes the $2^{nd}$ and the $3^{rd}$ least significant bits of the SFN.

4. The method of claim 1,
    wherein the second bit sequence is obtained based on an encoded bit sequence, and
    wherein the encoded bit sequence is produced based on channel coding for the first bit sequence.

5. The method of claim 4,
wherein the UE assumes that the second bit sequence is quadrature phase shift keying (QPSK) modulated into complex-valued symbols constituting the PBCH.

6. A method of receiving a physical broadcast channel (PBCH) by a user equipment (UE) in a wireless communication system, the method comprising:
receiving i) a synchronization signal/PBCH block (SS/PBCH block) including the PBCH and ii) a demodulation reference signal (DMRS) for the PBCH; and
obtaining a bit sequence of a PBCH payload, based on the PBCH,
wherein obtaining the bit sequence of the PBCH payload comprises:
obtaining a second bit sequence from the PBCH;
obtaining a first bit sequence based on the second bit sequence and a second scrambling sequence, wherein the second scrambling sequence and the DMRS are based on same bits of an index of the SS/PBCH block; and
obtaining the bit sequence of the PBCH payload based on the first bit sequence and a first scrambling sequence,
wherein the first scrambling sequence is based on $2^{nd}$ and $3^{rd}$ least significant bits of a system frame number (SFN) for a frame in which the PBCH is present.

7. The method of claim 6,
wherein the first and second scrambling sequences are further based on an identifier of a cell on which the SS/PBCH block is received.

8. The method of claim 6,
wherein the bit sequence of the PBCH payload includes the $2^{nd}$ and the $3^{rd}$ least significant bits of the SFN.

9. The method of claim 6, wherein obtaining the first bit sequence based on the second bit sequence and the second scrambling sequence comprises:
obtaining an encoded bit sequence based on the second bit sequence and the second scrambling sequence; and
obtaining the first bit sequence based on channel-decoding for the encoded bit sequence.

10. The method of claim 9, wherein obtaining the second bit sequence from the PBCH comprises:
obtaining the second bit sequence from complex-valued symbols constituting the PBCH based on quadrature phase shift keying (QPSK) modulation.

11. A user equipment (UE) for receiving a physical broadcast channel (PBCH) in a wireless communication system, the UE comprising:
at least one transceiver;
at least one processor; and
at least one computer memory operably connectable to the at least one processor and storing instructions that, when executed by the at least one processor, perform operations comprising:
receiving i) a synchronization signal/PBCH block (SS/PBCH block) including the PBCH and ii) a demodulation reference signal (DMRS) for the PBCH; and
obtaining a bit sequence of a PBCH payload, based on the PBCH,
wherein a second bit sequence is obtained based on a first bit sequence and a second scrambling sequence, wherein the second scrambling sequence and the DMRS are based on same bits of an index of the SS/PBCH block,
wherein the first bit sequence is obtained based on the bit sequence of the PBCH payload and a first scrambling sequence, and
wherein the first scrambling sequence is based on $2^{nd}$ and $3^{rd}$ least significant bits of a system frame number (SFN) for a frame in which the PBCH is present.

12. The UE of claim 11,
wherein the first and second scrambling sequences are further based on an identifier of a cell on which the SS/PBCH block is received.

13. The UE of claim 11,
wherein the bit sequence of the PBCH payload includes the $2^{nd}$ and the $3^{rd}$ least significant bits of the SFN.

14. The UE of claim 11,
wherein the second bit sequence is obtained based on an encoded bit sequence, and
wherein the encoded bit sequence is produced based on channel coding for the first bit sequence.

15. The UE of claim 14, wherein the operations comprise:
assuming that the second bit sequence is quadrature phase shift keying (QPSK) modulated into complex-valued symbols constituting the PBCH.

16. A user equipment (UE) for receiving a physical broadcast channel (PBCH) in a wireless communication system, the UE comprising:
at least one transceiver;
at least one processor; and
at least one computer memory operably connectable to the at least one processor and storing instructions that, when executed by the at least one processor, perform operations comprising:
receiving i) a synchronization signal/PBCH block (SS/PBCH block) including the PBCH and ii) a demodulation reference signal (DMRS) for the PBCH; and
obtaining a bit sequence of a PBCH payload, based on the PBCH,
wherein obtaining the bit sequence of the PBCH payload comprises:
obtaining a second bit sequence from the PBCH;
obtaining a first bit sequence based on the second bit sequence and a second scrambling sequence, wherein the second scrambling sequence and the DMRS are based on same bits of an index of the SS/PBCH block; and
obtaining the bit sequence of the PBCH payload based on the first bit sequence and a first scrambling sequence,
wherein the first scrambling sequence is based on $2^{nd}$ and $3^{rd}$ least significant bits of a system frame number (SFN) for a frame in which the PBCH is present.

17. The UE of claim 16,
wherein the first and second scrambling sequences are further based on an identifier of a cell on which the SS/PBCH block is received.

18. The UE of claim 16,
wherein the bit sequence of the PBCH payload includes the $2^{nd}$ and the $3^{rd}$ least significant bits of the SFN.

19. The UE of claim 16, wherein obtaining the first bit sequence based on the second bit sequence and the second scrambling sequence comprises:
obtaining an encoded bit sequence based on the second bit sequence and the second scrambling sequence; and
obtaining the first bit sequence based on channel-decoding for the encoded bit sequence.

20. The UE of claim 19, wherein obtaining the second bit sequence from the PBCH comprises:
  obtaining the second bit sequence from complex-valued symbols constituting the PBCH based on quadrature phase shift keying (QPSK) modulation.

\* \* \* \* \*